(12) United States Patent
Utsunomiya

(10) Patent No.: US 10,442,177 B2
(45) Date of Patent: Oct. 15, 2019

(54) THREE-DIMENSIONAL OBJECT FORMATION APPARATUS, THREE-DIMENSIONAL OBJECT FORMATION SYSTEM, CONTROL METHOD OF THREE-DIMENSIONAL OBJECT FORMATION APPARATUS, AND CONTROL PROGRAM OF THREE-DIMENSIONAL OBJECT FORMATION APPARATUS

(71) Applicant: SEIKO EPSON CORPORATION, Tokyo (JP)

(72) Inventor: Kohei Utsunomiya, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 559 days.

(21) Appl. No.: 14/855,568

(22) Filed: Sep. 16, 2015

(65) Prior Publication Data
US 2016/0151969 A1 Jun. 2, 2016

(30) Foreign Application Priority Data

Nov. 28, 2014 (JP) ................................. 2014-240711

(51) Int. Cl.
| | |
|---|---|
| *B29C 64/112* | (2017.01) |
| *B33Y 50/02* | (2015.01) |
| *B33Y 10/00* | (2015.01) |
| *B33Y 30/00* | (2015.01) |
| *B29C 64/386* | (2017.01) |

(Continued)

(52) U.S. Cl.
CPC ............ *B33Y 50/02* (2014.12); *B29C 64/112* (2017.08); *B29C 64/386* (2017.08); *B33Y 10/00* (2014.12); *B33Y 30/00* (2014.12); *B29C 64/106* (2017.08); *B29C 64/209* (2017.08); *B29K 2995/0021* (2013.01)

(58) Field of Classification Search
None
See application file for complete search history.

(56) References Cited

U.S. PATENT DOCUMENTS

| | | | | |
|---|---|---|---|---|
| 5,506,607 A | * | 4/1996 | Sanders, Jr. ............... | B41J 2/01 118/695 |
| 2004/0141018 A1 | * | 7/2004 | Silverbrook ............ | B22F 3/008 347/4 |

(Continued)

FOREIGN PATENT DOCUMENTS

| | | |
|---|---|---|
| EP | 2189272 A2 | 5/2010 |
| JP | 2011-073163 A | 4/2011 |
| JP | 2013-075390 A | 4/2013 |

*Primary Examiner* — William P Bell
*Assistant Examiner* — Andrew L Swanson

(57) ABSTRACT

Provided is a three-dimensional object formation apparatus including: a head unit which discharges a plurality of types of liquid including first liquid and second liquid and forms dots with the discharged liquid; and a curing unit which cures the dots, in which the three-dimensional object formation apparatus forms a three-dimensional object with the cured dots, and the three-dimensional object is formed in a plurality of formation modes including a first formation mode of forming an inner portion of the three-dimensional object with a plurality of dots formed of the first liquid, and a second formation mode of forming the inner portion of the three-dimensional object with a plurality of dots not including dots formed of the first liquid and including dots formed of the second liquid.

12 Claims, 16 Drawing Sheets

(51) Int. Cl.
*B29C 64/106* (2017.01)
*B29C 64/209* (2017.01)

(56) References Cited

U.S. PATENT DOCUMENTS

2006/0127153 A1* 6/2006 Menchik .................. B41J 2/175
 400/62
2013/0053995 A1* 2/2013 Hashimoto ............. B29C 64/00
 700/97

* cited by examiner

| DOT SIZE | SI[m] (b1, b2) | Sel[m] | | |
|---|---|---|---|---|
| | | Ts1 | Ts2 | Ts3 |
| LARGE DOT | (1, 1) | H | H | H |
| MEDIUM DOT | (1, 0) | H | H | L |
| SMALL DOT | (0, 1) | H | L | L |
| NON-RECORDING | (0, 0) | L | L | L |

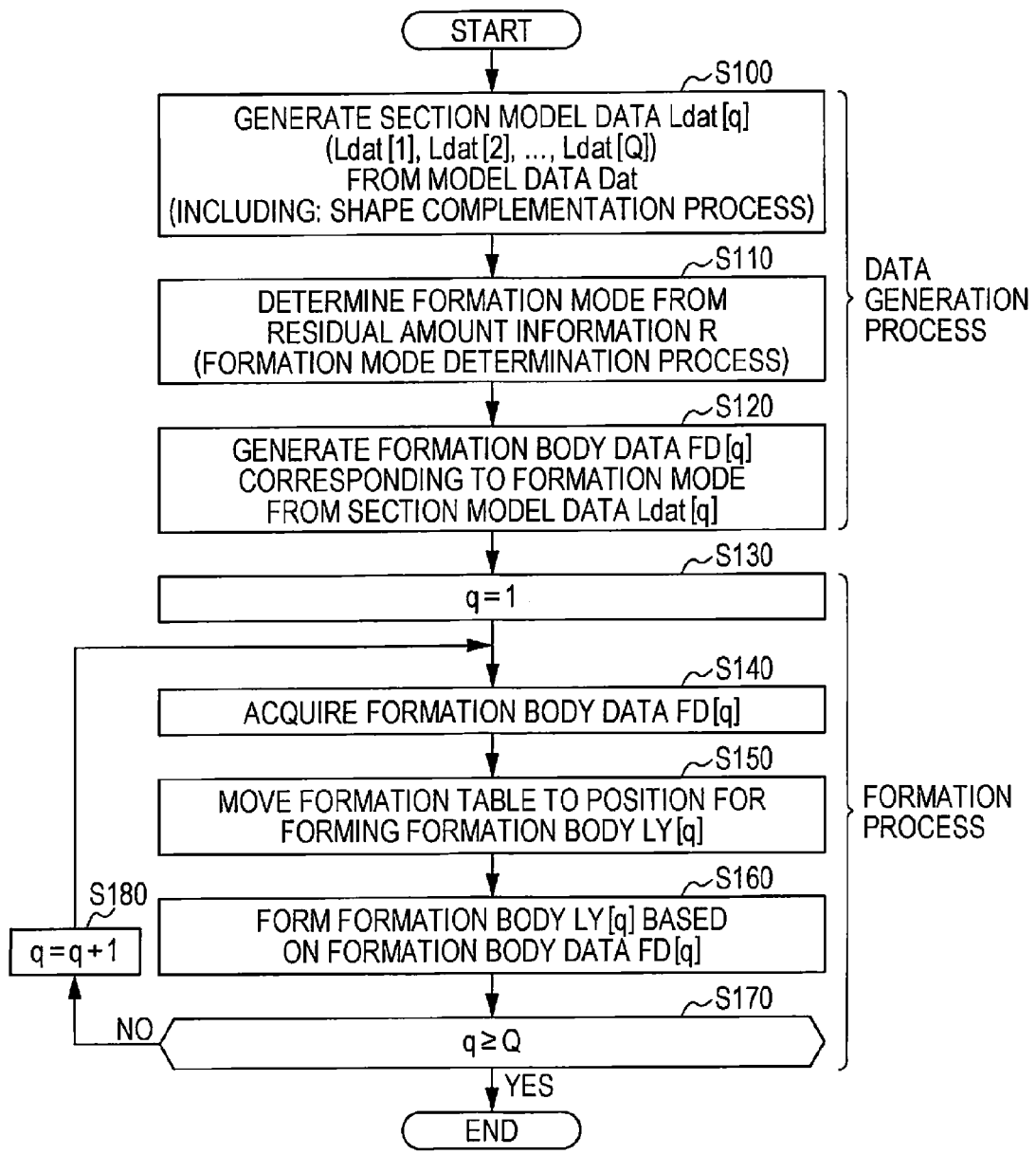

THREE-DIMENSIONAL OBJECT

SECTION OF THREE-DIMENSIONAL OBJECT

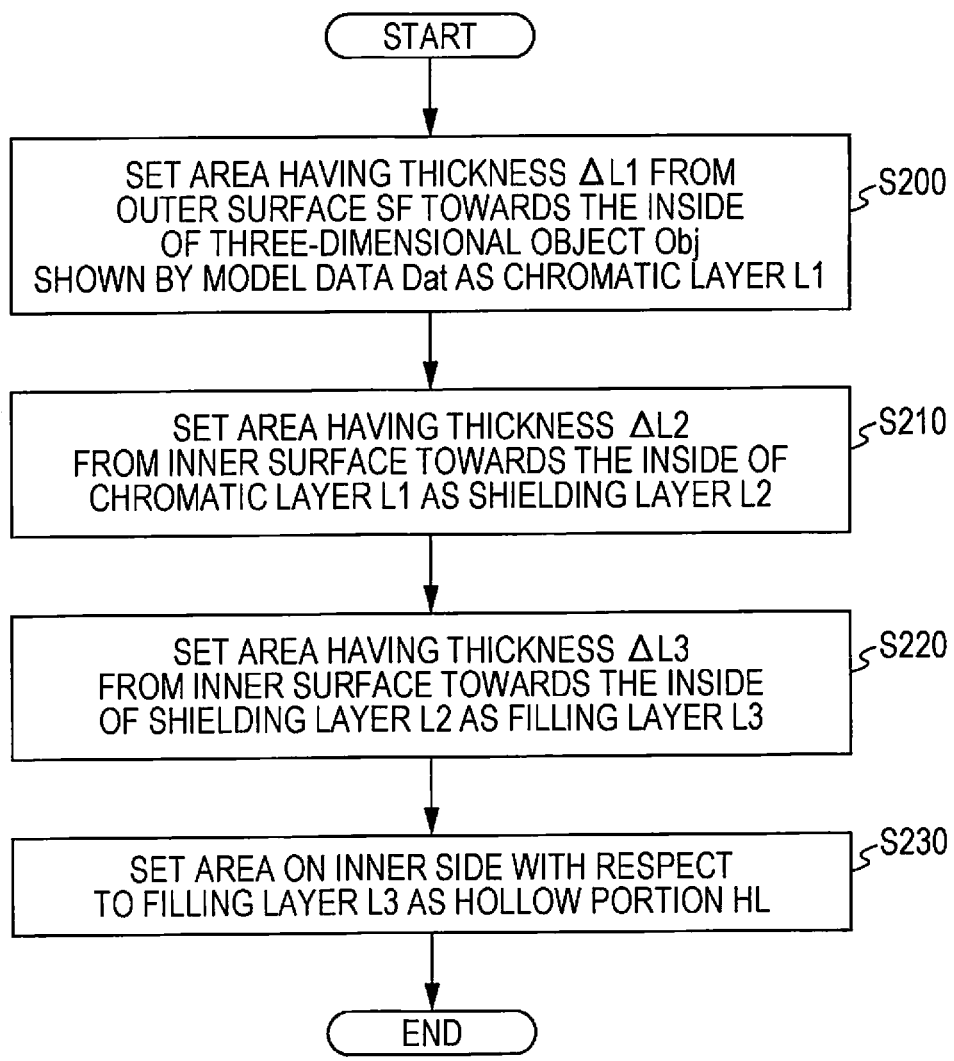

FIG. 13

| RESIDUAL AMOUNT RCL (COMPARISON CONTENT) | FORMATION MODE |
|---|---|
| RCL ≤ α1 | SWITCH FORMATION MODE |
| α1 < RCL ≤ α2 | MIXED FORMATION MODE |
| α2 < RCL | NORMAL FORMATION MODE |

FIG. 15

| RESIDUAL AMOUNT RCL (COMPARISON CONTENT) | FORMATION MODE |
|---|---|
| RCL−WCL ≤ $\beta$1 | SWITCH FORMATION MODE |
| $\beta$1 < RCL−WCL ≤ $\beta$2 | MIXED FORMATION MODE |
| $\beta$2 < RCL−WCL | NORMAL FORMATION MODE |

FIG. 16

| RESIDUAL AMOUNT RCL (COMPARISON CONTENT) | FORMATION MODE |
|---|---|
| RCL ≤ $\alpha$1 | SWITCH FORMATION MODE |
| $\alpha$1 < RCL | NORMAL FORMATION MODE |

FIG. 17

| RESIDUAL AMOUNT RCL (COMPARISON CONTENT) | FORMATION MODE |
|---|---|
| RCL−WCL ≤ $\beta$1 | SWITCH FORMATION MODE |
| $\beta$1 < RCL−WCL | NORMAL FORMATION MODE |

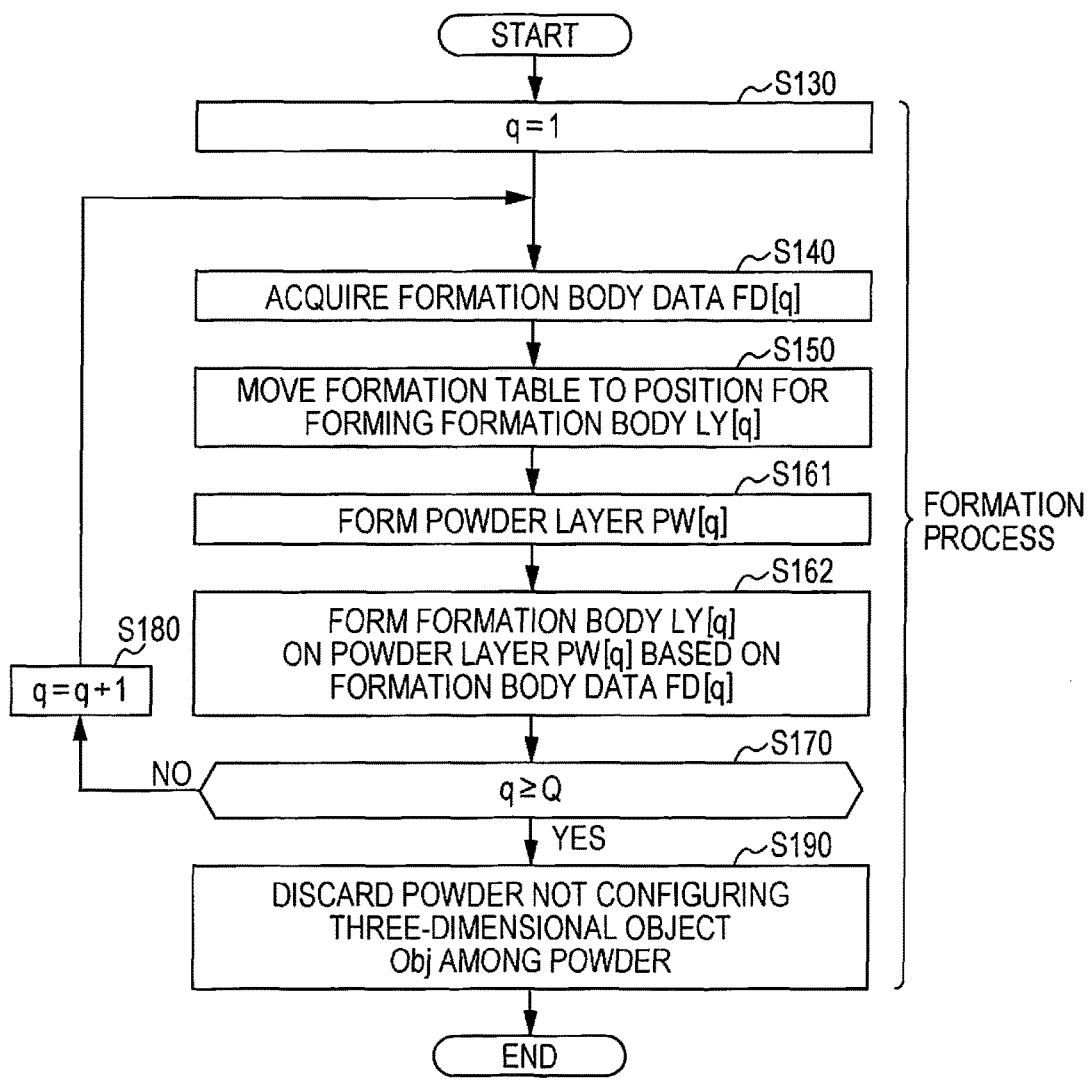

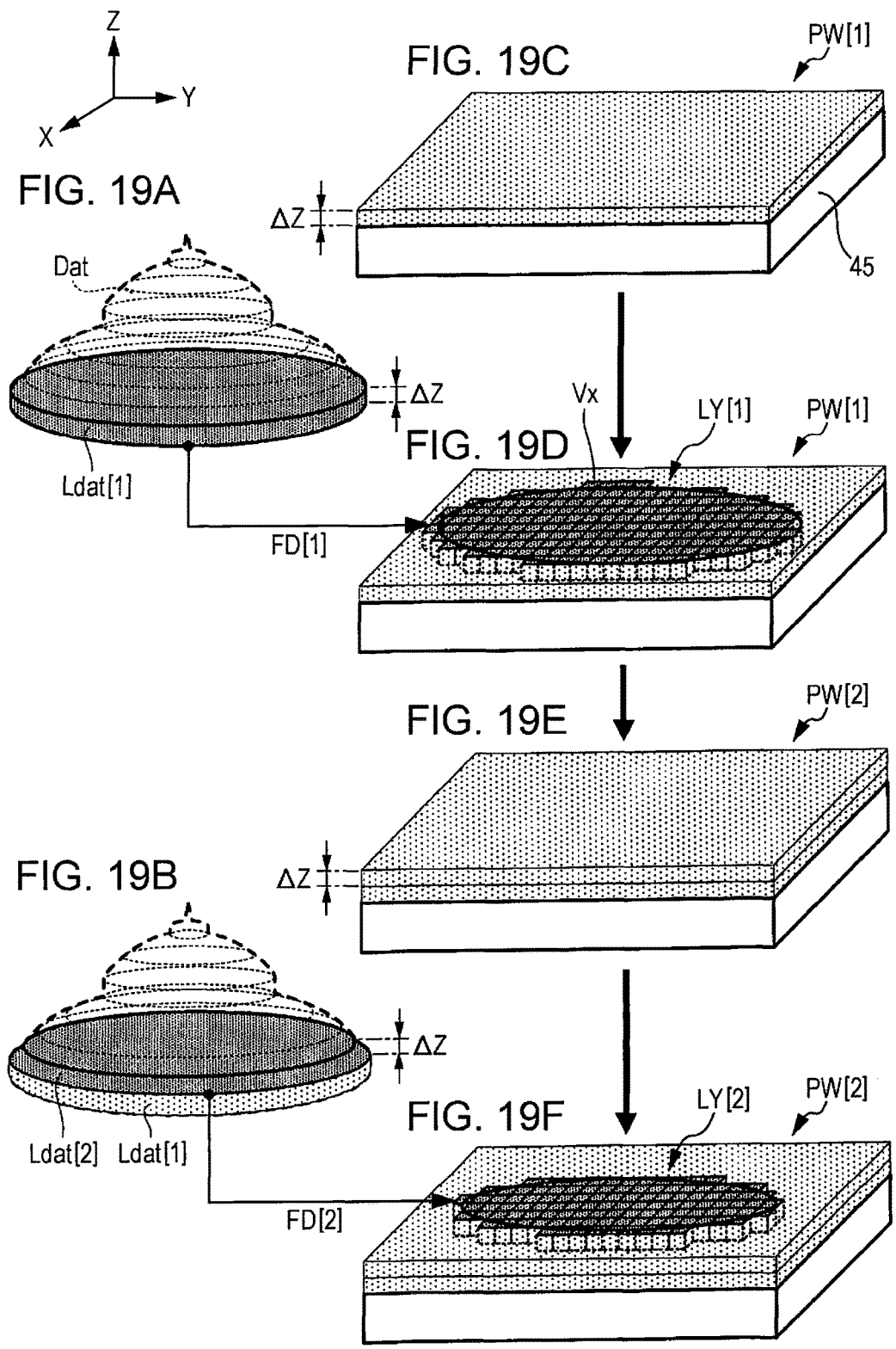

THREE-DIMENSIONAL OBJECT FORMATION APPARATUS, THREE-DIMENSIONAL OBJECT FORMATION SYSTEM, CONTROL METHOD OF THREE-DIMENSIONAL OBJECT FORMATION APPARATUS, AND CONTROL PROGRAM OF THREE-DIMENSIONAL OBJECT FORMATION APPARATUS

This application claims priority to Japanese Patent Application No. 2014-240711 filed on Nov. 28, 2014. The entire disclosure of Japanese Patent Application No. 2014-240711 is hereby incorporated herein by reference.

BACKGROUND

1. Technical Field

The present invention relates to a three-dimensional object formation apparatus, a three-dimensional object formation system, a control method of a three-dimensional object formation apparatus, and a control program of a three-dimensional object formation apparatus.

2. Related Art

In recent years, various three-dimensional object formation apparatuses such as a 3D printer have been proposed. The three-dimensional object formation apparatus executes a formation process of curing dots which are formed by discharging liquid such as ink, forming a formation body having a predetermined thickness with the cured dots, and laminates the formed formation bodies to form a three-dimensional object.

In such a three-dimensional object formation apparatus, in order to form a colored three-dimensional object, a technology of forming an outer area including an outer surface of the three-dimensional object with a coloring liquid such as color ink and forming an inner area on the inner side (inside) with respect to the outer area with inside filling liquid has been proposed (for example, JP-A-2013-075390).

However, a formation process may be stopped due to insufficient liquid for forming the three-dimensional object during the execution of the formation process. Regarding the three-dimensional object formed through stopping and restarting of the operation, variations in a degree of curing of dots configuring the three-dimensional object are easily generated due to a factor of generation of variation in curing time for curing the liquid due to the stopping, compared to a three-dimensional object which is formed in a formation process without stopping. In this case, color unevenness, concavities and convexities, or a decrease in strength may be generated on the formed three-dimensional object and a possibility of a decrease in quality of the three-dimensional object may be increased.

In general, the volume of the inner area of the three-dimensional object is greater than the outer area which is a surface part of the three-dimensional object. Accordingly, a large amount of the inside filling liquid used in the formation of the inner area of the three-dimensional object may be necessary, compared to the liquid for forming other areas of the three-dimensional object. Thus, this leads to lack of the inside filing liquid during the execution of the formation process stopping the formation process, and accordingly, quality of the formed three-dimensional object is decreased.

SUMMARY

An advantage of some aspects of the invention is to provide a technology of decrease a possibility of stopping a formation process caused by insufficient liquid used in the formation of a three-dimensional object, during execution of the formation process of forming the three-dimensional object by a three-dimensional object formation apparatus.

According to an aspect of the invention, there is provided a three-dimensional object formation apparatus including: a head unit which discharges a plurality of types of liquid including first liquid and second liquid and forms dots with the discharged liquid; and a curing unit which cures the dots, in which the three-dimensional object formation apparatus forms a three-dimensional object with the cured dots, and the three-dimensional object is formed in a plurality of formation modes including a first formation mode of forming an inner portion of the three-dimensional object with a plurality of dots formed of the first liquid, and a second formation mode of forming the inner portion of the three-dimensional object with a plurality of dots not including dots formed of the first liquid and including dots formed of the second liquid.

In this case, the inner portion of the three-dimensional object can be formed with the first liquid or the second liquid which is different type from the first liquid. Accordingly, it is possible to decrease a possibility of running out of the liquid used in the formation of the inner portion of the three-dimensional object, compared to a case of forming the inner portion of the three-dimensional object with only one type of liquid. That is, in this case, it is possible to decrease a possibility of stopping a formation process due to lack of liquid used in the formation of the inner portion of the three-dimensional object, during execution of the formation process of forming the three-dimensional object. Therefore, it is possible to prevent a decrease in quality of the three-dimensional object due to the stopping of the formation process.

In the three-dimensional object formation apparatus described above, it is preferable that the plurality of formation modes further includes a third formation mode of forming an inner portion of the three-dimensional object with a plurality of dots including dots formed of the first liquid and dots formed of the second liquid.

In this case, the inner portion of the three-dimensional object can be formed with two types of liquid of the first liquid and the second liquid. Accordingly, it is possible to decrease a possibility of lack of the liquid used in the formation of the inner portion of the three-dimensional object, compared to a case of forming the inner portion of the three-dimensional object with only one type of liquid. Therefore, it is possible to decrease a possibility of stopping of the formation process.

In the three-dimensional object formation apparatus described above, it is preferable that the three-dimensional object formation apparatus further includes a storage unit which stores the first liquid, and an output unit which outputs residual amount information showing a residual amount of the first liquid stored in the storage unit, the three-dimensional object is formed in the second formation mode, when the residual amount of the first liquid shown by the residual amount information is equal to or smaller than a first reference amount.

In this case, the inner portion of the three-dimensional object is formed with the second liquid, when the residual amount of the first liquid is equal to or smaller than the first reference amount and the first liquid may run out during the execution of the formation process. Therefore, it is possible to decrease a possibility of stopping of the formation process. The first reference amount may be an amount equal to or greater than "0".

In the three-dimensional object formation apparatus described above, it is preferable that the three-dimensional object formation apparatus further includes a storage unit which stores the first liquid, and an output unit which outputs residual amount information showing a residual amount of the first liquid stored in the storage unit, the three-dimensional object is formed in the second formation mode, when an amount obtained by subtracting a consumption amount of the first liquid necessary for the formation of the three-dimensional object from a residual amount of the first liquid shown by the residual amount information is equal to or smaller than a first reference amount.

In this case, the inner portion of the three-dimensional object is formed with the second liquid, when the amount of the first liquid after forming the inner portion of the three-dimensional object using the first liquid is equal to or smaller than the first reference amount and the first liquid may run out during the execution of the formation process. Therefore, it is possible to decrease a possibility of stopping of the formation process. The first reference amount may be an amount equal to or greater than "0".

According to another aspect of the invention, there is provided a three-dimensional object formation apparatus including: a head unit which discharges a plurality of types of liquid including a first liquid and a second liquid and forms dots with the discharged liquid; and a curing unit which cures the dots, in which the three-dimensional object formation apparatus forms a three-dimensional object with the cured dots, the three-dimensional object is formed in a plurality of formation modes including a first formation mode of forming an inner portion of the three-dimensional object with a plurality of dots formed of the first liquid, and a third formation mode of forming the inner portion of the three-dimensional object with a plurality of dots including dots formed of the first liquid and dots formed of the second liquid.

In this case, the inner portion of the three-dimensional object can be formed with two types of liquid of the first liquid and the second liquid. Accordingly, it is possible to decrease a possibility of lack of the liquid used in the formation of the inner portion of the three-dimensional object, compared to a case of forming the inner portion of the three-dimensional object with only one type of liquid. Therefore, it is possible to decrease a possibility of stopping of the formation process.

In the three-dimensional object formation apparatus described above, it is preferable that the three-dimensional object formation apparatus further includes a storage unit which stores the first liquid, and an output unit which outputs residual amount information showing a residual amount of the first liquid stored in the storage unit, the three-dimensional object is formed in the first formation mode, when the residual amount of the first liquid shown by the residual amount information is greater than a second reference amount, and the three-dimensional object is formed in the third formation mode, when the residual amount of the first liquid shown by the residual amount information is equal to or smaller than the second reference amount.

In this case, the inner portion of the three-dimensional object is formed using both of the first liquid and the second liquid, when the residual amount of the first liquid is equal to or smaller than the second reference amount and the residual amount of the first liquid is insufficient. Therefore, it is possible to decrease a possibility of stopping of the formation process due to lack of liquid used in the formation of the inner portion of the three-dimensional object. The second reference amount may be an amount greater than "0".

In the three-dimensional object formation apparatus described above, it is preferable that the three-dimensional object formation apparatus further includes a storage unit which stores the first liquid, and an output unit which outputs residual amount information showing a residual amount of the first liquid stored in the storage unit, the three-dimensional object is formed in the first formation mode, when an amount obtained by subtracting a consumption amount of the first liquid necessary for the formation of the three-dimensional object from a residual amount of the first liquid shown by the residual amount information is greater than a second reference amount, and the three-dimensional object is formed in the third formation mode, when an amount obtained by subtracting a consumption amount of the first liquid necessary for the formation of the three-dimensional object from a residual amount of the first liquid shown by the residual amount information is equal to or smaller than the second reference amount.

In this case, the inner portion of the three-dimensional object is formed using both of the first liquid and the second liquid, when the amount of the first liquid after forming the inner portion of the three-dimensional object using the first liquid is equal to or smaller than the second reference amount and the residual amount of the first liquid is insufficient. Therefore, it is possible to decrease a possibility of stopping of the formation process due to lack of liquid used in the formation of the inner portion of the three-dimensional object. The second reference amount may be an amount greater than "0".

In the three-dimensional object formation apparatus described above, it is preferable that the second liquid is achromatic liquid.

In this case, since the inner portion of the three-dimensional object is formed using the achromatic liquid, a proper color can be displayed when executing the coloring on the outer surface of the three-dimensional object.

In the three-dimensional object formation apparatus described above, it is preferable that the second liquid reflects visible light at a rate equal to or greater than a predetermined rate.

In this case, since the inner portion of the three-dimensional object is formed using gray liquid which is closer to white, a proper color can be displayed when executing the coloring on the outer surface of the three-dimensional object.

According to still another aspect of the invention, there is provided a control method of a three-dimensional object formation apparatus which includes a head unit which discharges a plurality of types of liquid including a first liquid and a second liquid and forms dots with the discharged liquid, and a curing unit which cures the dots, and forms a three-dimensional object with the cured dots, the method including: controlling the head unit so as to form the three-dimensional object in one formation mode among a plurality of formation modes including a first formation mode of forming an inner portion of the three-dimensional object with a plurality of dots formed of the first liquid, and a second formation mode of forming the inner portion of the three-dimensional object with a plurality of dots not including dots formed of the first liquid and including dots formed of the second liquid.

In this case, since the inner portion of the three-dimensional object can be formed with the first liquid or the second liquid, it is possible to decrease a possibility of running out of the liquid used in the formation of the inner portion of the three-dimensional object, compared to a case of forming the inner portion of the three-dimensional object with only one type of liquid. Therefore, it is possible to prevent a decrease in quality of the three-dimensional object due to the stopping of the formation process.

According to still another aspect of the invention, there is provided a control program of a three-dimensional object formation apparatus which includes a head unit which discharges a plurality of types of liquid including a first liquid and a second liquid and forms dots with the discharged liquid, and a curing unit which cures the dots, and a computer, and forms a three-dimensional object with the cured dots, the program causing the computer to function as: a formation control unit which controls the head unit so as to form the three-dimensional object in one formation mode among a plurality of formation modes including a first formation mode of forming an inner portion of the three-dimensional object with a plurality of dots formed of the first liquid, and a second formation mode of forming the inner portion of the three-dimensional object with a plurality of dots not including dots formed of the first liquid and including dots formed of the second liquid.

In this case, since the inner portion of the three-dimensional object can be formed with the first liquid or the second liquid, it is possible to decrease a possibility of running out of the liquid used in the formation of the inner portion of the three-dimensional object, compared to a case of forming the inner portion of the three-dimensional object with only one type of liquid. Therefore, it is possible to prevent a decrease in quality of the three-dimensional object due to the stopping of the formation process.

According to still another aspect of the invention, there is provided a three-dimensional object formation system including: a head unit which discharges a plurality of types of liquid including a first liquid and a second liquid and forms dots with the discharged liquid; a curing unit which cures the dots; and a system control unit which controls an operation of the head unit so as to form a three-dimensional object with the cured dots, in which the system control unit selects one formation mode among a plurality of formation modes including a first formation mode of forming an inner portion of the three-dimensional object with a plurality of dots formed of the first liquid, and a second formation mode of forming the inner portion of the three-dimensional object with a plurality of dots not including dots formed of the first liquid and including dots formed of the second liquid, and controls the operation of the head unit in the one formation mode.

In this case, since the inner portion of the three-dimensional object can be formed with the first liquid or the second liquid, it is possible to decrease a possibility of running out of the liquid used in the formation of the inner portion of the three-dimensional object, compared to a case of forming the inner portion of the three-dimensional object with only one type of liquid. Therefore, it is possible to prevent a decrease in quality of the three-dimensional object due to the stopping of the formation process.

BRIEF DESCRIPTION OF THE DRAWINGS

The invention will be described with reference to the accompanying drawings, wherein like numbers reference like elements.

FIG. 10 is a flowchart showing a data generation process and a formation process.

FIG. 12 is a flowchart showing a shape complementation process.

FIG. 13 is an explanatory diagram for illustrating a formation mode.

FIG. 15 is an explanatory diagram for illustrating a formation mode according to Modification Example 1.

FIG. 16 is an explanatory diagram for illustrating a formation mode according to Modification Example 2.

FIG. 17 is an explanatory diagram for illustrating a formation mode according to Modification Example 2.

FIG. 18 is a flowchart showing a data generation process and a formation process according to Modification Example 6.

FIGS. 19A to 19F are explanatory diagrams for illustrating formation of a three-dimensional object performed by a three-dimensional object formation system according to Modification Example 6.

DESCRIPTION OF EXEMPLARY EMBODIMENTS

Hereinafter, embodiments for realizing the invention will be described with reference to the drawings. Herein, in each drawing, dimensions and scales of each drawing are appropriately modified from the actual dimensions and scales. The embodiments which will be described below are preferable specific examples of the invention, and therefore, various technologically preferable limitations are set. However, the scope of the invention is not limited to the embodiments, unless there is a limitation of the invention in the following description.

A. Embodiment

In the embodiment, as a three-dimensional object formation apparatus, an ink jet type three-dimensional object formation apparatus which discharges a curable ink (an example of "liquid") such as resin ink containing a resin emulsion or ultraviolet curable ink to form a three-dimensional object Obj will be described as an example.

1. Configuration of Three-Dimensional Object Formation System

Hereinafter, a configuration of a three-dimensional object formation system 100 including a three-dimensional object formation apparatus 1 according to the embodiment will be described with reference to FIG. 1 to FIG. 9.

Figure 1:
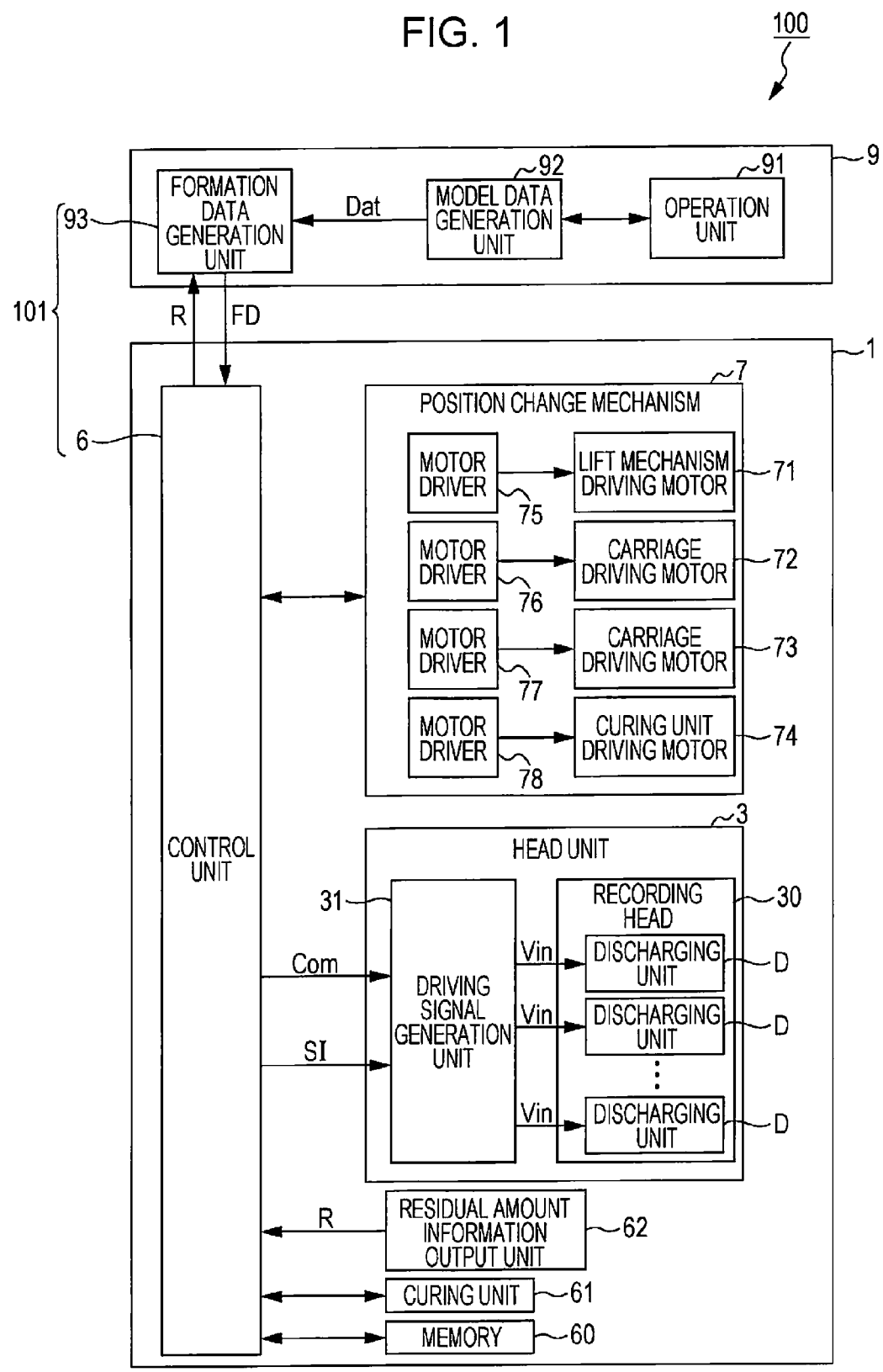
FIG. 1 is a block diagram showing a configuration of a three-dimensional object formation system according to the invention.

FIG. 1 is a functional block diagram showing a configuration of the three-dimensional object formation system 100.

As shown in FIG. 1, the three-dimensional object formation system 100 includes the three-dimensional object formation apparatus 1 which executes a formation process of discharging ink, forming a layered formation body LY having a predetermined thickness $\Delta Z$ with dots formed by the discharged ink, and laminating the formation bodies LY to form a three-dimensional object Obj, and a host computer 9 which executes a data generation process of generating formation body data FD which determines a shape and a color of each of the plural formation bodies LY configuring the three-dimensional object Obj which is formed by the three-dimensional object formation apparatus 1.

1.1. Host Computer

As shown in FIG. 1, the host computer 9 includes a CPU (not shown) which controls an operation of each unit of the host computer 9, a display unit (not shown) such as a display, an operation unit 91 such as a keyboard or a mouse, an information memory (not shown) on which a control program of the host computer 9, a driver program of the three-dimensional object formation apparatus 1, and an application program such as computer aided design (CAD) software are recorded, a model data generation unit 92 which generates model data Dat, and a formation data generation unit 93 which executes a data generation process of generating the formation body data FD based on the model data Dat.

Herein, the model data Dat is data showing the shape and the color of the model representing a three-dimensional object Obj which is to be formed by the three-dimensional object formation apparatus 1 and is data for designating the shape and the color of the three-dimensional object Obj. Hereinafter, the color of the three-dimensional object Obj includes a method of applying the plurality of colors when the plurality of colors are applied to the three-dimensional object Obj, that is, the pattern, characters, and other images represented with the plurality of colors applied to the three-dimensional object Obj.

The model data generation unit 92 is a functional block which is realized by execution of the application program recorded the information memory by the CPU of the host computer 9. The model data generation unit 92 is, for example, a CAD application, and generates the model data Dat which designates the shape and the color of the three-dimensional object Obj based on information which is input by operating the operation unit 91 by a user of the three-dimensional object formation system 100.

In the embodiment, a case where the model data Dat designates an external shape of the three-dimensional object Obj is assumed. That is, a case where the model data Dat is data which designates a shape of a hollow object in a case where it is assumed that the three-dimensional object Obj is the hollow object, that is, an outer surface SF (see FIGS. 2A to 2E or FIGS. 11A and 11B which will be described later) which is an outline of the three-dimensional object Obj, is assumed. For example, when the three-dimensional object Obj is a sphere, the model data Dat designates a spherical shape which is an outline of the sphere.

However, the invention is not limited to such an embodiment, and the model data Dat may include at least information in which the shape of the outer surface SF of the three-dimensional object Obj can be specified. For example, the model data Dat may designate a shape of the inside of the three-dimensional object Obj with respect to the outer surface SF or a material of the three-dimensional object Obj, in addition to the shape of the outer surface SF of the three-dimensional object Obj and the color of the three-dimensional object Obj.

As the model data Dat, a data format such as Additive Manufacturing File Format (AMF) or stereolithography can be used, for example.

The formation data generation unit 93 is a functional block which is realized by execution of the driver program of the three-dimensional object formation apparatus 1 recorded on the information memory by the CPU of the host computer 9. The formation data generation unit 93 executes a data generation process of generating the formation body data FD which determines a shape and a color of the formation body LY formed by the three-dimensional object formation apparatus 1, based on the model data Dat generated by the model data generation unit 92.

Hereinafter, a case where the three-dimensional object Obj is formed by laminating Q layered formation bodies LY is assumed (Q is a natural number satisfying an expression of $Q \geq 2$). The process of forming the formation bodies LY by the three-dimensional object formation apparatus 1 is referred to as a lamination process. That is, the formation process of forming the three-dimensional object Obj by the three-dimensional object formation apparatus 1 includes Q times of the lamination processes. Hereinafter, a formation body LY which is formed in the q-th lamination process among the Q times of the lamination processes included in the formation process is referred to as a formation body LY[q] and the formation body data FD which determines the shape and the color of the formation body LY[q] is referred to as the formation body data FD[q] (q is a natural number satisfying an expression of $1 \leq q \leq Q$).

Although will be described later in detail, the formation data generation unit 93 executes a formation mode determination process of determining a formation mode which is an operation mode of the formation process executed by the three-dimensional object formation apparatus 1.

FIGS. 2A to 2E are explanatory diagrams for illustrating a relationship b between the shape of the outer surface SF of the three-dimensional object Obj designated by the model data Dat and the formation body LY formed based on the formation body data FD.

Figure 2A:
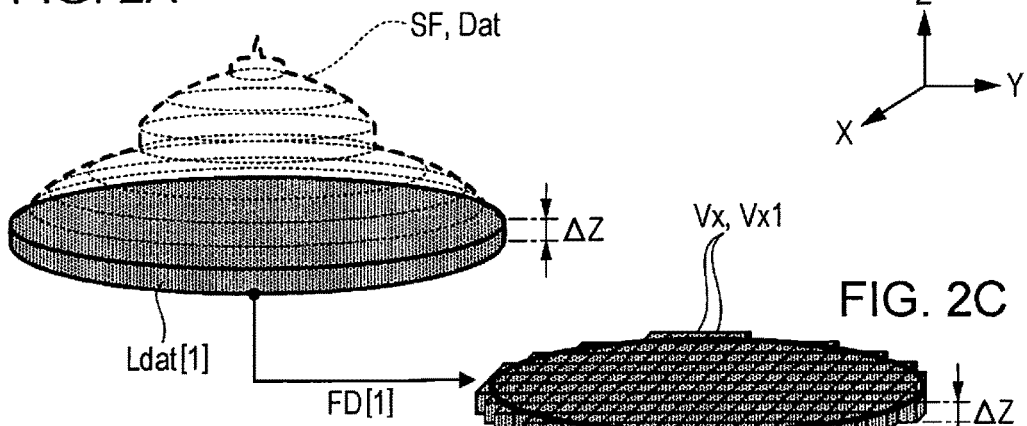
FIGS. 2A to 2E are explanatory diagrams for illustrating the formation of an object by the three-dimensional object formation system.
Figure 2C:
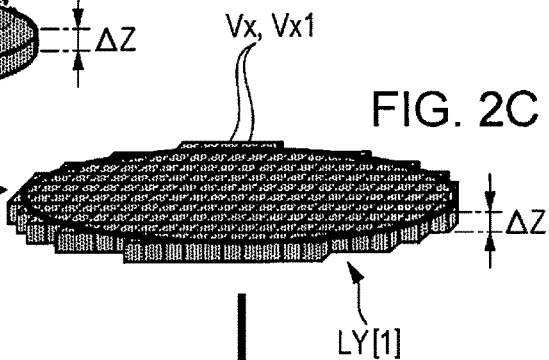
Figure 2B:
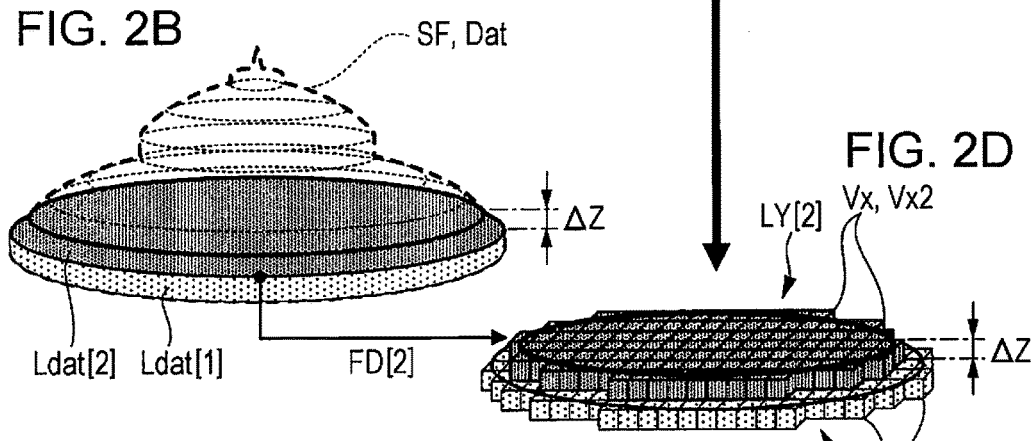

As shown in FIGS. 2A and 2B, in order to generate formation body data items FD[1] to FD[Q] which determine the shape and the color of formation bodies LY[1] to LY[Q] having a predetermined thickness $\Delta Z$, the formation data generation unit 93 first slices a three-dimensional shape of the outer surface SF designated by the model data Dat into the predetermined thickness $\Delta Z$ to generate section model data items Ldat[1] to Ldat[Q] corresponding to the formation bodies LY[1] to LY[Q]. Herein, the section model data Ldat is data showing the shape and the color of the section body which is obtained by slicing the shape of the three-dimensional shape designated by the model data Dat. However, the section model data Ldat may be data including the shape and the color of the section body when the shape of the three-dimensional shape designated by the model data Dat is sliced. FIG. 2A shows the section model data Ldat[1] corresponding to the formation body LY[1] which is formed in the first lamination process and FIG. 2B shows the section model data Ldat[2] corresponding to the formation body LY[2] which is formed in the second lamination process.

Next, in order to form the formation body LY[q] corresponding to the shape and the color shown by the section model data Ldat[q], the formation data generation unit 93 determines the arrangement of dots to be formed by the three-dimensional object formation apparatus 1 and outputs the determined results as the formation body data FD[q]. That is, the formation body data FD[q] is data which designates dots to be formed in each of plural voxels Vx, when the shape and the color shown by the section model data Ldat[q] are segmented in a granular shape and the shape and the color shown by the section model data Ldat[q] are represented as an assembly of voxels Vx. Herein, the voxel Vx is a cuboid or a cube having a predetermined size and is a cuboid or a cube having the predetermined thickness ΔZ and a predetermined volume. In the embodiment, the volume and the size of the voxel Vx are determined according to the size of the dots which can be formed by the three-dimensional object formation apparatus 1. Hereinafter, the voxel Vx corresponding to the formation body LY[q] may be referred to as a voxel Vxq.

Hereinafter, a constituent element of the formation body LY configuring the three-dimensional object Obj which is formed corresponding to one voxel Vx and has the predetermined volume and the predetermined thickness ΔZ may be referred to as a unit structure. The details will be described later, but the unit structure is configured with one or the plurality of dots. That is, the unit structure is one or the plurality of dots which are formed so as to satisfy one voxel Vx. That is, in the embodiment, the formation body data FD designates that one or the plurality of dots are formed in each voxel Vx.

Figure 2D:
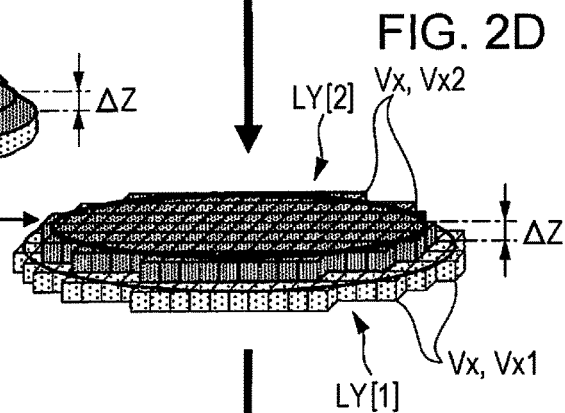

As shown in FIGS. 2C and 2D, the three-dimensional object formation apparatus 1 executes the lamination process of forming the formation body LY[q] based on the formation body data FD[q] generated by the formation data generation unit 93. FIG. 2C shows the first formation body LY[1] formed on a formation table 45 (see FIG. 3) based on the formation body data FD[1] generated from the section model data Ldat[1] and FIG. 2D shows the second formation body LY[2] formed on the formation body LY[1] based on the formation body data FD[2] generated from the section model data Ldat[2].

Figure 2E:
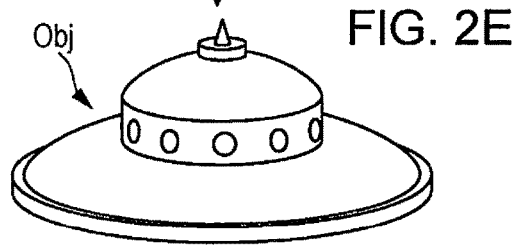

As shown in FIG. 2E, the three-dimensional object formation apparatus 1 forms the three-dimensional object Obj by sequentially laminating the formation bodies LY[1] to LY[Q] formed based on the formation body data items FD[1] to FD[Q].

As described above, the model data Dat according to the embodiment designates the shape of the outer surface SF (shape of the outline) of the three-dimensional object Obj. Accordingly, when the three-dimensional object Obj having the shape shown by the model data Dat is reliably formed, the shape of the three-dimensional object Obj becomes a hollow shape only having an outline without any thickness. However, when forming the three-dimensional object Obj, it is preferable to determine the shape of the inside with respect to the outer surface SF, by considering the strength of the three-dimensional object Obj. Specifically, when forming the three-dimensional object Obj, it is preferable that a part or the entirety of the inside of the three-dimensional object Obj with respect to the outer surface SF has a solid structure.

Accordingly, as shown in FIGS. 2A to 2E, the formation data generation unit 93 according to the embodiment generates the formation body data FD so that a part or the entirety of the inside with respect to the outer surface SF has a solid structure, regardless of the fact that the shape designated by the model data Dat is a hollow shape.

Hereinafter, a process of complementing the hollow portion having a shape shown by the model data Dat and generating the section model data Ldat showing the shape in which a part or the entire hollow portion has a solid structure is referred to as a shape complementation process. The shape complementation process and the structure of the inside with respect to the outer surface SF designated by the data generated by the shape complementation process will be described later in detail.

In the example shown in FIGS. 2A to 2E, a voxel Vx1 configuring the formation body LY[1] formed in the first lamination process exists on the lower side (negative Z direction) of a voxel Vx2 configuring the formation body LY[2] formed in the second lamination process. However, the voxel Vx1 may not exist on the lower side of the voxel Vx2 depending on the shape of the three-dimensional object Obj. In such a case, although a dot is attempted to be formed in the voxel Vx2, the dot may fall down. Accordingly, when an expression of "q≥2" is satisfied, it is necessary to provide a support for supporting the dots formed in the voxel Vxq at least on the lower side of the voxel Vxq, in order to form the dots configuring the formation body LY[q] in the voxel Vxq as originally intended.

Therefore, in the embodiment, the formation layer data FD includes the data which determines the shape of the support which is necessary when forming the three-dimensional object Obj, in addition to the three-dimensional object Obj. That is, in the embodiment, both of a portion of the three-dimensional object Obj to be formed in the q-th lamination process and a portion of the support to be formed in the q-th lamination process are included in the formation body LY[q]. That is, the formation body data FD[q] includes data representing the shape and the color of the part of the three-dimensional object Obj formed as the formation body LY[q] as an assembly of the voxel Vxq, and data representing the shape of the portion of the support formed as the formation body LY[q] an assembly of the voxel Vxq.

The formation data generation unit 93 according to the embodiment determines whether or not it is necessary to provide the support for forming the voxel Vxq, based on the section model data Ldat and the model data Dat. When the result of the determination is positive, the formation data generation unit 93 generates the formation body data FD for providing the support in addition to the three-dimensional object Obj.

The support is preferably configured with a material which is easily removed after the formation of the three-dimensional object Obj, for example, water-soluble ink.

1.2. Three-Dimensional Object Formation Apparatus

Figure 3:
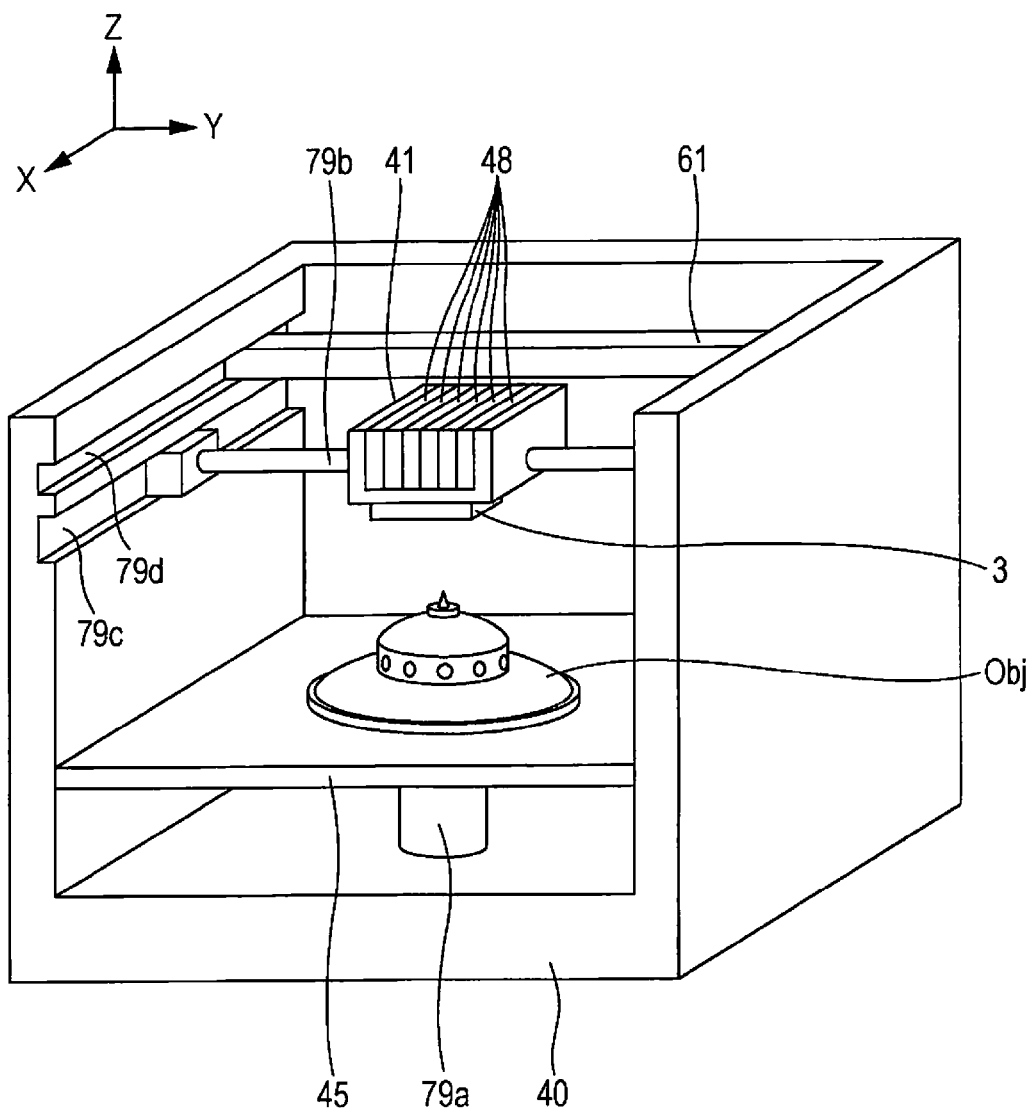
FIG. 3 is a schematic sectional view of a three-dimensional object formation apparatus.

Next, Next, the three-dimensional object formation apparatus 1 will be described with reference to FIG. 3, in addition to FIG. 1. FIG. 3 is a perspective view schematically showing the structure of the three-dimensional object formation apparatus 1.

As shown in FIG. 1 and FIG. 3, the three-dimensional object formation apparatus 1 includes a housing 40, the formation table 45, a control unit 6 (an example of a "formation control unit") which controls the operation of each unit of the three-dimensional object formation apparatus 1, a head unit 3 in which a recording head 30 including a discharging unit D discharging ink towards the formation table 45 is provided, a curing unit 61 which cures ink discharged onto the formation table 45, six ink cartridges 48, six ink cartridges 48 (an example of a "storage unit") which stores ink, a carriage 41 on which the head unit 3 and the ink cartridges 48 are mounted, a position change mechanism 7 for changing the positions of the head unit 3, the formation table 45, and the curing unit 61 with respect to the housing 40, a memory 60 on which a control program of the three-dimensional object formation apparatus 1 or other various information items are recorded, a residual amount information output unit 62 (an example of an "output unit") which outputs residual amount information R showing a residual amount of the ink stored in each ink cartridge 48.

The residual amount information output unit 62 is, for example, a weight scale which detects weight of ink stored in each ink cartridge 48 and outputs the detected result as the residual amount information R, an illuminometer which measures intensity of light transmitting the ink when the light is emitted to the ink stored in the each ink cartridge 48 and outputs the measured result as the residual amount information R, or a counter which counts the number of times of discharging of the ink stored in each ink cartridge 48 from the discharging unit D and outputs a counted value as the residual amount information R.

The control unit 6 and the formation data generation unit 93 function as a system control unit 101 which controls the operation of each unit of the three-dimensional object formation system 100. The control unit 6 supplies the residual amount information R output by the residual amount information output unit 62 to the formation data generation unit 93.

The curing unit 61 is a constituent element for curing ink which is discharged onto the formation table 45, and a light source for emitting an ultraviolet ray to ultraviolet curable ink or a heater for heating resin ink can be exemplified, for example. When the curing unit 61 is a light source of an ultraviolet ray, the curing unit 61 is, for example, provided on the upper side (positive Z direction) of the formation table 45. Meanwhile, when the curing unit 61 is a superheater, the curing unit 61 may be, for example, embedded in the formation table 45 or provided on the lower side of the formation table 45. Hereinafter, the description will be made by assuming that the curing unit 61 is a light source of an ultraviolet ray and the curing unit 61 is positioned in the positive Z direction of the formation table 45.

The six ink cartridges 48 are provided to correspond to a total of six types of ink including five colored formation inks for forming the three-dimensional object Obj and a supporting ink for forming the support, one by one. The type of ink corresponding to the ink cartridge 48 is stored in each ink cartridge 48.

The five colored formation ink for forming the three-dimensional object Obj include the chromatic ink including a chromatic color material component, the achromatic ink including an achromatic color material component, and clear (CL) ink having the content of the color material component per unit weight or unit volume which is smaller compared to the chromatic ink and the achromatic ink.

In the embodiment, as the chromatic ink, three colored ink of cyan (CY), magenta (MG), and yellow (YL) are used. In the embodiment, the white (WT) ink is used as the achromatic ink. When the light having a wavelength belonging to the wavelength area (approximately 400 nm to 700 nm) of a visible light, the white ink according to the embodiment is ink which reflects a predetermined percentages or more light among the emitted light. The expression that "the predetermined percentages or more light is reflected" has the same meaning as the expression that "less than the predetermined percentages or more light is absorbed or transmitted", and for example, corresponds to a case where the rate of the intensity of light reflected by the white ink with respect to the intensity of light emitted to the white ink is equal to or greater than the predetermined percentage. In the embodiment, the "predetermined percentage" may be, for example, an arbitrary percentage from 30% to 100%, preferably an arbitrary percentage equal to or greater than 50%, and more preferably an arbitrary percentage equal to or greater than 80%. In the embodiment, the clear ink is ink having small content of a color material component and high transparency, compared to the chromatic ink and the achromatic ink.

Each ink cartridge 48 may be provided in separate places of the three-dimensional object formation apparatus 1, instead of being mounted on the carriage 41.

As shown in FIG. 1 and FIG. 3, the position change mechanism 7 includes a lift mechanism driving motor 71 for driving a formation table lift mechanism 79*a* which lifts the formation table 45 up and down in the positive Z direction and the negative Z direction (hereinafter, the positive Z direction and the negative Z direction may be collectively referred to as the "Z axis direction"), a carriage driving motor 72 for moving the carriage 41 along a guide 79*b* in a positive Y direction and a negative Y direction (hereinafter, the positive Y direction and the negative Y direction may be collectively referred to as the "Y axis direction"), a carriage driving motor 73 for moving the carriage 41 along a guide 79*c* in a positive X direction and a negative X direction (hereinafter, the positive X direction and the negative X direction may be collectively referred to as the "X axis direction"), and a curing unit driving motor 74 for moving the curing unit 61 along a guide 79*d* in the positive X direction and the negative X direction.

In addition, the position change mechanism 7 includes a motor driver 75 for driving the lift mechanism driving motor 71, a motor driver 76 for driving the carriage driving motor 72, a motor driver 77 for driving the carriage driving motor 73, and a motor driver 78 for driving the curing unit driving motor 74.

The memory 60 includes an electrically erasable programmable read-only memory (EEPROM) which is one kind of a nonvolatile semiconductor memory which stores the formation body data FD supplied from the host computer 9, a random access memory (RAM) which temporarily stores data which is necessary for executing various processes such as a formation process of forming the three-dimensional object Obj or temporarily develops a control program for controlling each unit of the three-dimensional object formation apparatus 1 so as to execute various processes such as the formation process, and a PROM which is one kind of a nonvolatile semiconductor memory which stores the control program.

The control unit 6 is configured to include a central processing unit (CPU) or a field-programmable gate array (FPGA) and controls the operation of each unit of the three-dimensional object formation apparatus 1 with the operation of the CPU which is performed along with the control program recorded on the memory 60.

The control unit 6 controls the operation of the head unit 3 and the position change mechanism 7 based on the formation body data FD supplied from the host computer 9 and accordingly, controls the execution of the formation process of forming the three-dimensional object Obj corresponding to the model data Dat on the formation table 45.

Specifically, first, the control unit 6 stores the formation body data FD supplied from the host computer 9 in the memory 60. Next, the control unit 6 generates various signals including a driving waveform signal Com and a waveform designation signal SI for driving the discharging unit D by controlling the operation of the head unit 3, based on various data recorded on the memory 60 such as the formation body data FD, and outputs the generated signals. In addition, the control unit 6 generates various signals for controlling the operations of the motor drivers 75 to 78 based on various data recorded on the memory 60 such as the formation body data FD, and outputs the generated signals.

The driving waveform signal Com is an analog signal. Accordingly, the control unit 6 includes a DA conversion signal (not shown) and converts a digital driving waveform signal generated in the CPU included in the control unit 6 into the analog driving waveform signal Com and then outputs the driving waveform signal.

As described above, the control unit 6 controls a relative position of the head unit 3 to the formation table 45 through the control of the motor drivers 75, 76, and 77 and controls a relative position of the curing unit 61 to the formation table 45 through the control of the motor drivers 75 and 78. In addition, the control unit 6 controls discharge or non-discharge of the ink from the discharging unit D, an amount of the ink discharged, and discharge timing of the ink through the control of the head unit 3.

Accordingly, the control unit 6 controls the execution of the lamination process of forming the dots on the formation table 45 and curing the dots formed on the formation table 45 to form the formation body LY, while adjusting the dot size and the dot arrangement regarding the dots which are formed by the ink discharged onto the formation table 45. In addition, the control unit 6 controls the execution of the formation process of laminating the new formation body LY on the formation body LY already formed by repeatedly executing the lamination process and accordingly forming the three-dimensional object Obj corresponding to the model data Dat.

As shown in FIG. 1, the head unit 3 includes the recording head 30 including M discharging units D and a driving signal generation unit 31 which generates driving signals Vin for driving the discharging units D (M is a natural number equal to or greater than 1).

Hereinafter, in order to differentiate each of the M discharging units D provided in the recording head 30, the discharging units may be referred to as first, second, . . . , M-th discharging unit, sequentially. In addition, hereinafter, an m-th discharging unit D among the M discharging units D provided in the recording head 30 may be expressed as a discharging unit D[m] (m is a natural number which satisfies an expression of 1≤m≤M). In addition, hereinafter, a driving signal Vin for driving the discharging unit D[m] among the driving signals generated by the driving signal generation unit 31 may be expressed as a driving signal Vin[m].

The driving signal generation unit 31 will be described later in detail.

1.3. Recording Head

Next, the recording head 30 and the discharging units D provided in the recording head 30 will be described with reference to FIG. 4 to FIG. 6.

Figure 4:
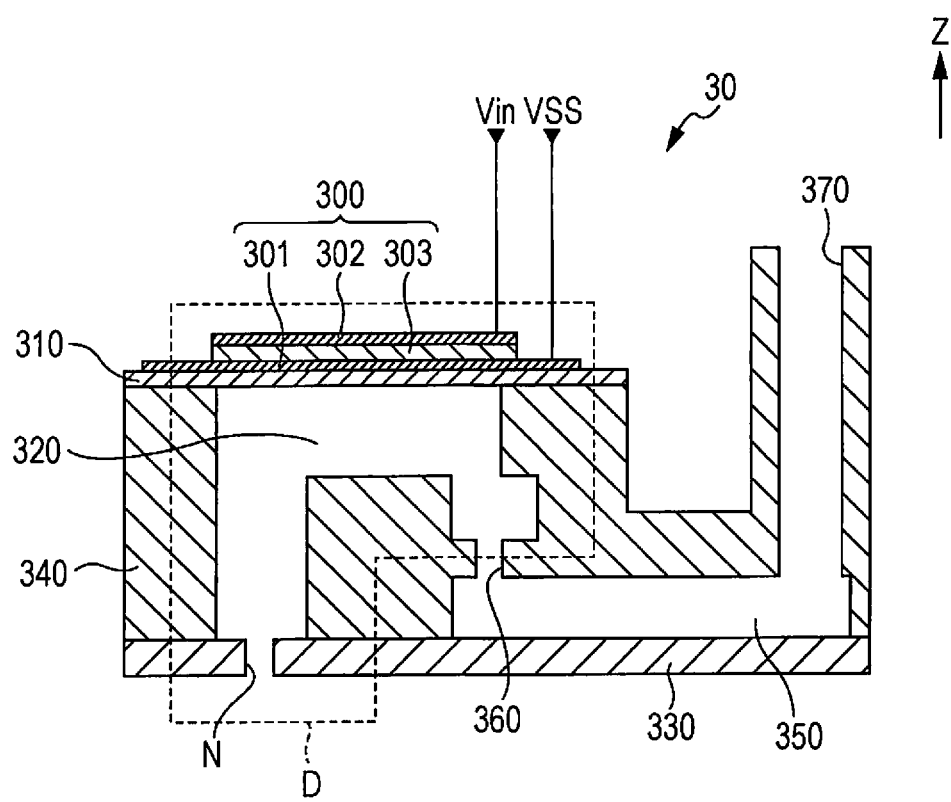
FIG. 4 is a schematic sectional view of a recording head.

FIG. 4 is an example of a schematic partial sectional view of the recording head 30. In this drawing, for convenience of illustration, in the recording head 30, one discharging unit D among the M discharging units D included in the recording head 30, a reservoir 350 which is linked to the one discharging unit D through an ink supply port 360, and an ink inlet 370 for supplying the ink to the reservoir 350 from the ink cartridge 48 are shown.

As shown in FIG. 4, the discharging unit D includes a piezoelectric element 300, a cavity 320 filled with the ink, a nozzle N which is linked to the cavity 320, and a vibration plate 310. The piezoelectric element 300 is driven by the driving signal yin and accordingly the discharging unit D discharges the ink in the cavity 320 from the nozzle N. The cavity 320 is a space which is partitioned by a cavity plate 340 which is formed in a predetermined shape so as to have a recess, a nozzle plate 330 on which the nozzle N is formed, and the vibration plate 310. The cavity 320 is linked to the reservoir 350 through the ink supply port 360. The reservoir 350 is linked to one ink cartridge 48 through the ink inlet 370.

In the embodiment, a unimorph (monomorph) type as shown in FIG. 4 is used, for example, as the piezoelectric element 300. The piezoelectric element 300 is not limited to the unimorph type, and any type may be used such as a bimorph type or a lamination type, as long as the piezoelectric element 300 can be deformed to discharge the liquid such as ink.

The piezoelectric element 300 includes a lower electrode 301, an upper electrode 302, and a piezoelectric body 303 which is provided between the lower electrode 301 and the upper electrode 302. When a potential of the lower electrode 301 is set as a predetermined reference potential VSS, the driving signal Vin is supplied to the upper electrode 302, and accordingly, a voltage is applied between the lower electrode 301 and the upper electrode 302, the piezoelectric element 300 is bent (displaced) in a vertical direction of the drawing according to the applied voltage and as a result, the piezoelectric element 300 is vibrated.

The vibration plate 310 is installed on the upper opening of the cavity plate 340 and the lower electrode 301 is bonded to the vibration plate 310. Accordingly, when the piezoelectric element 300 is vibrated by the driving signal Vin, the vibration plate 310 is also vibrated. The volume of the cavity 320 (pressure in the cavity 320) changes according to the vibration of the vibration plate 310 and the ink filled in the cavity 320 is discharged by the nozzle N. When the ink in the cavity 320 is decreased due to the discharge of the ink, the ink is supplied from the reservoir 350. In addition, the ink is supplied to the reservoir 350 from the ink cartridge 48 through the ink inlet 370.

Figure 5A:
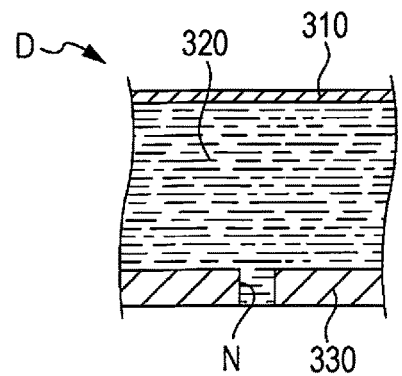
FIGS. 5A to 5C are explanatory diagrams for illustrating an operation of a discharging unit when supplying a driving signal.
Figure 5B:
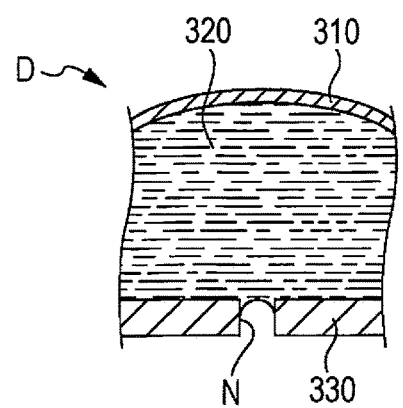
Figure 5C:
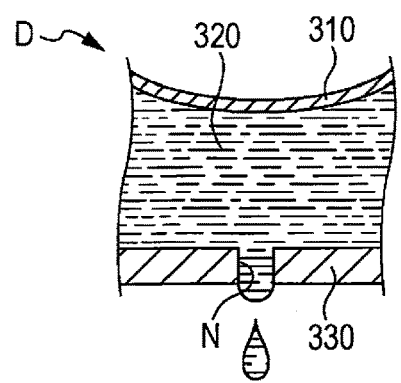

FIGS. 5A to 5C are explanatory diagrams illustrating a discharging operation of the ink from the discharging unit D. In a state shown in FIG. 5A, when the driving signal Vin is supplied to the piezoelectric element 300 included in the discharging unit D from the driving signal generation unit 31, distortion according to an electric field applied between the electrodes occurs in the piezoelectric element 300 and the vibration plate 310 of the discharging unit D is bent in the vertical direction of the drawing. Accordingly, as shown in FIG. 5B, the volume of the cavity 320 of the discharging unit D is expanded, compared to the initial state shown in FIG. 5A. In the state shown in FIG. 5B, when the potential shown by the driving signal Vin is changed, the vibration plate 310 is restored by an elastic restoring force and is moved downwards of the drawing by passing the position of the vibration plate 310 in the initial state, and the volume of the cavity 320 is rapidly contracted as shown in FIG. 5C. At that time, some ink filled in the cavity 320 is discharged as ink droplets from the nozzle N which is linked to the cavity 320, due to compression pressure generated in the cavity 320.

Figure 6:
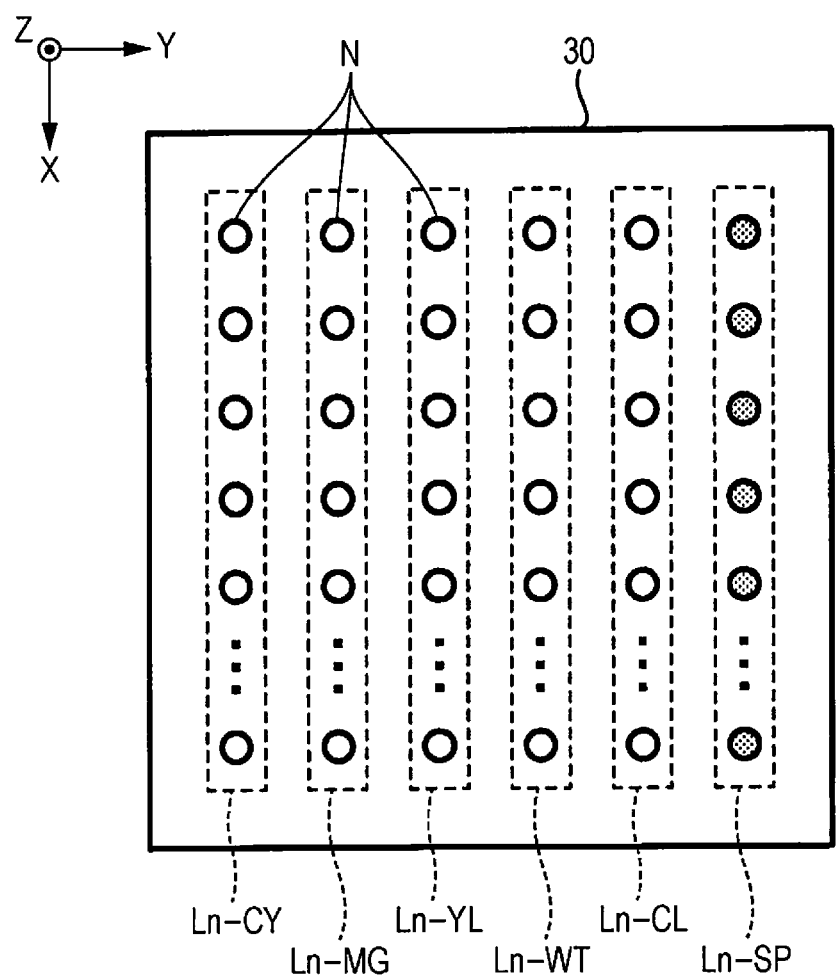
FIG. 6 is a plan view showing an arrangement example of nozzles of the recording head.

FIG. 6 is an explanatory diagram for illustrating an example of arrangement of M nozzles N provided in the recording head 30 in a plan view of the three-dimensional object formation apparatus 1 in a positive Z direction or a negative Z direction.

As shown in FIG. 6, in the recording head 30, six nozzle arrays Ln formed of a nozzle array Ln-CY formed of a plurality of nozzles N, a nozzle array Ln-MG formed of a plurality of nozzles N, a nozzle array Ln-YL formed of a plurality of nozzles N, a nozzle array Ln-WT formed of a plurality of nozzles N, a nozzle array Ln-CL formed of a plurality of nozzles N, and a nozzle array Ln-SP formed of a plurality of nozzles N, are provided.

Herein, the nozzle N belonging to the nozzle array Ln-CY is a nozzle N provided in the discharging unit D for discharging the cyan (CY) ink, the nozzle N belonging to the nozzle array Ln-MG is a nozzle N provided in the discharging unit D for discharging the magenta (MG) ink, the nozzle N belonging to the nozzle array Ln-YL is a nozzle N provided in the discharging unit D for discharging the yellow (YL) ink, the nozzle N belonging to the nozzle array Ln-WT is a nozzle N provided in the discharging unit D for discharging the white (WT) ink, the nozzle N belonging to the nozzle array Ln-CL is a nozzle N provided in the discharging unit D for discharging the clear (CL) ink, and the nozzle N belonging to the nozzle array Ln-SP is a nozzle N provided in the discharging unit D for discharging the supporting ink.

In the embodiment, as shown in FIG. 6, a case where the plurality of nozzles N configuring each nozzle array Ln are arranged to be lined up in a line in the X axis direction has been used, but for example, the nozzles may be arranged in a so-called zigzag manner in which the positions of some nozzles N (for example, the even-numbered nozzles N) of the plurality of nozzles N configuring each nozzle array Ln and the positions of the other nozzles N (for example, odd-numbered nozzles N) are different from each other in the Y axis direction.

In addition, in each nozzle array Ln, a gap (pitch) between the nozzles N can be appropriately set according to the printing resolution (dpi: dot per inch).

1.4. Driving Signal Generation Unit

Next, the configuration and the operation of the driving signal generation unit 31 will be described with reference to FIG. 7 to FIG. 9.

Figure 7:
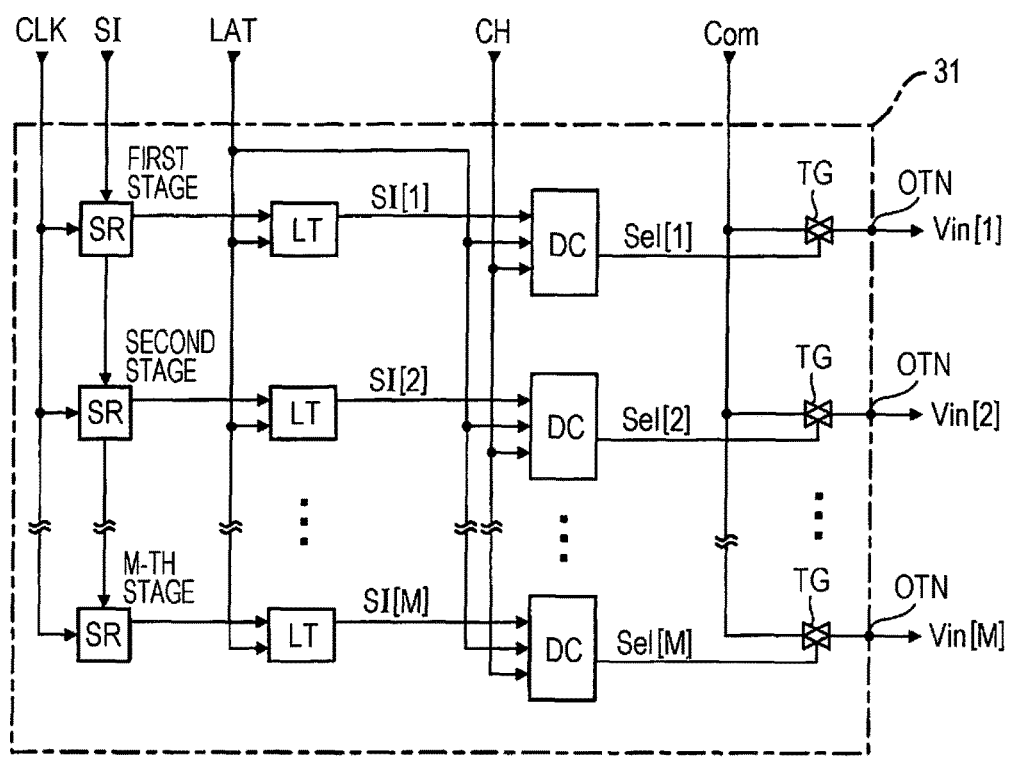
FIG. 7 is a block diagram showing a configuration of a driving signal generation unit.

FIG. 7 is a block diagram showing the configuration of the driving signal generation unit 31.

As shown in FIG. 7, the driving signal generation unit 31 includes M sets consisting of a shift resistor SR, a latch circuit LT, a decoder DC, and a transmission gate TG so as to respectively correspond to the M discharging units D provided in the recording head 30. Hereinafter, each element configuring the M sets included in the driving signal generation unit 31 and the recording head 30 is referred to as a first, second, . . . , and M-th element in the order from the top of the drawing.

A clock signal CLK, the waveform designation signal SI, a latch signal LAT, a change signal CH, and the driving waveform signal Com are supplied to the driving signal generation unit 31 from the control unit 6.

The waveform designation signal SI is a digital signal which designates an ink amount to be discharged by the discharging unit D and includes the waveform designation signals SI[1] to SI[M].

Among these, a waveform designation signal SI[m] regulates discharge or non-discharge of the ink from the discharging unit D[m] and the amount of the ink discharged with two bits of a high-order bit b1 and a low-order bit b2. Specifically, the waveform designation signal SI[m] regulates any one of discharging of ink of an amount corresponding to a large dot, discharging of ink of an amount corresponding to a medium dot, discharging of ink of an amount corresponding to a small dot, and non-discharging of ink, regarding the discharging unit D[m].

Each shift resistor SR temporarily holds the waveform designation signal SI[m] of two bits corresponding to each stage among the waveform designation signals SI (SI[1] to SI[m]). Specifically, the first, second, . . . , and M-th M shift resistors SR respectively corresponding to the M discharging units D[1] to D[M] are cascade-connected to each other, and the waveform designation signals SI supplied in serial order are transmitted in the order according to the clock signal CLK. When the waveform designation signals SI are transmitted to all of the M shift resistors SR, each of the M shift resistors SR holds the corresponding waveform designation signal SI[m] of 2 bits among the waveform designation signals SI.

Each of the M latch circuits LT simultaneously latches the waveform designation SI[m] of 2 bits corresponding to each stage held by each of the M shift resistors SR, at a timing when the latch signal LAT rises.

However, an operation period which is a period for executing the formation process by the three-dimensional object formation apparatus 1 is configured from a plurality of unit periods Tu. In the embodiment, each unit period Tu is formed of three control periods Ts (Ts1 to Ts3). In the embodiment, the three control periods Ts1 to Ts3 have a duration equivalent to each other. Although will be described later in detail, the unit period Tu is regulated by the latch signal LAT, and the control period Ts is regulated by the latch signal LAT and the change signal CH.

The control unit 6 supplies the waveform designation signal SI[m] to the driving signal generation unit 31 at a timing before the unit period Tu is started. The control unit 6 supplies the latch signal LAT to each latch circuit LT of the driving signal generation unit 31 so that the waveform designation signal SI[m] is latched in each unit period Tu.

The m-th decoder DC decodes the waveform designation signal SI[m] of 2 bits which is latched by the m-th latch circuit LT and outputs a selection signal Sel[m] which is set as any level of a high level (H level) and a low level (L level) in each of the control periods Ts1 to Ts3.

Figures 8, 9:
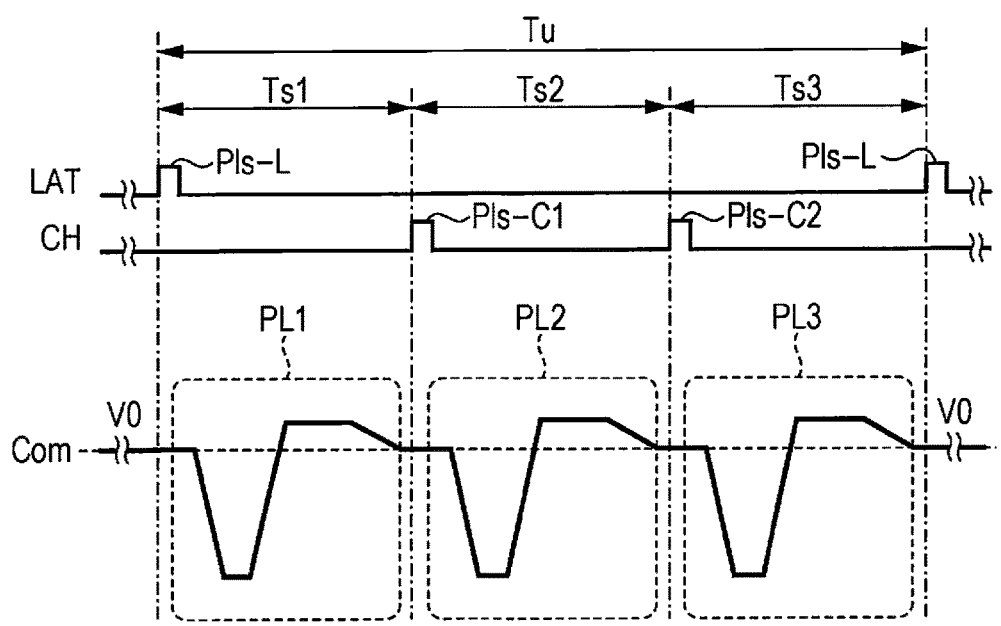
FIG. 8 is an explanatory diagram showing the content of a selection signal.
FIG. 9 is a timing chart showing waveforms of a driving waveform signal.

FIG. 8 is an explanatory diagram for illustrating the content of the decoding performed by the decoder DC.

As shown in the drawing, when the content shown by the waveform designation signal SI[m] is (b1,b2)=(1,1), the m-th decoder DC sets the selection signal Sel[m] as the H level in the control periods Ts1 to Ts3, when the content shown by the waveform designation signal SI[m] is (b1,b2)=(1,0), the m-th decoder DC sets the selection signal Sel[m] as the H level in the control periods Ts1 and Ts2 and sets the selection signal Sel[m] as the L level in the control period Ts3, when the content shown by the waveform designation signal SI[m] is (b1,b2)=(0,1), the m-th decoder DC sets the selection signal Sel[m] as the H level in the control period Ts1 and sets the selection signal Sel[m] as the L level in the control periods Ts2 and Ts3, and when the content shown by the waveform designation signal SI[m] is (b1,b2)=(0,0), the m-th decoder DC sets the selection signal Sel[m] as the L level in the control periods Ts1 to Ts3.

As shown in FIG. 7, the M transmission gates TG included in the driving signal generation unit 31 are provided so as to correspond to the M discharging units D included in the recording head 30.

The m-th transmission gate TG is turned on when the selection signal Sel[m] output from the m-th decoder DC is in the H level and is turned off when the selection signal is in the L level. The driving waveform signal Com is supplied to one terminal of each transmission gate TG. The other terminal of the m-th transmission gate TG is electrically connected to an m-th output terminal OTN.

When the selection signal Sel[m] is set as the H level and the m-th transmission gate TG is turned on, the driving waveform signal Com is supplied from the m-th output terminal OTN to the discharging unit D[m] as the driving signal Vin[m].

Although will be described later in detail, in the embodiment, a potential of the driving waveform signal Com at a timing when the state of the transmission gate TG is switched from on to off (that is, timing of the start and the end of the control periods Ts1 to Ts3) is set as a reference potential V0. Accordingly, when the transmission gate TG is turned off, the potential of the output terminal OTN is maintained as the reference potential V0 by the volume or the like of the piezoelectric element 300 of the discharging unit D[m]. Hereinafter, for convenience of description, the description will be made by assuming that, when the transmission gate TG is turned off, the potential of the driving signal Vin[m] is maintained as the reference potential V0.

As described above, the control unit 6 controls the driving signal generation unit 31 so that the driving signal Vin is supplied to each discharging unit D in each unit period Tu. Accordingly, each discharging unit D can discharge the amount of ink corresponding to a value shown by the waveform designation signal SI determined based on the formation body data FD in each unit period Tu and can form dots corresponding to the formation body data FD on the formation table 45.

FIG. 9 is a timing chart for illustrating various signals supplied to the driving signal generation unit 31 by the control unit 6 in each unit period Tu.

As shown in FIG. 9, the latch signal LAT includes a pulse waveform Pls-L and the unit period Tu is regulated by the pulse waveform Pls-L. In addition, the change signal CH includes a pulse waveform Pls-C and the unit period Tu is divided into the control periods Ts1 to Ts3 by the pulse waveform Pls-C. Although not shown in the drawing, the control unit 6 synchronizes the waveform designation signal SI with the clock signal CLK in each unit period Tu and supplies the signal to the driving signal generation unit 31 in serial order.

As shown in FIG. 9, driving waveform signal Com includes a waveform PL1 disposed in the control period Ts1, a waveform PL2 disposed in the control period Ts2, and a waveform PL3 disposed in the control period Ts3. Hereinafter, the waveforms PL1 to PL3 may be collectively referred to as the waveform PL. In the embodiment, the potential of the driving waveform signal Com is set as the reference potential V0 at the timing of the start or the end of each control period Ts.

When the selection signal Sel[m] is in the H level in one control period Ts, the driving signal generation unit 31 supplies the waveform PL disposed in the one control period Ts in the driving waveform signal Com to the discharging unit D[m] as the driving signal Vin[m]. On the other hand, when the selection signal Sel[m] is in the L level in one control period Ts, the driving signal generation unit 31 supplies the driving waveform signal Com which is set as the reference potential V0 to the discharging unit D[m] as the driving signal Vin[m].

Accordingly, regarding the driving signal Vin[m] supplied by the driving signal generation unit 31 to the discharging unit D[m] in the unit period Tu, when the value shown by the waveform designation signal SI[m] is (b1,b2)=(1,1), the driving signal is a signal including the waveforms PL1 to PL3, when the value shown by the waveform designation signal SI[m] is (b1,b2)=(1,0), the driving signal is a signal including the waveforms PL1 and PL2, when the value shown by the waveform designation signal SI[m] is (b1,b2) =(0,1), the driving signal is a signal including the waveform PL1, and when the value shown by the waveform designation signal SI[m] is (b1,b2)=(0,0), the driving signal is a signal which is set as the reference potential V0.

When the driving signal Vin[m] including one waveform PL is supplied, the discharging unit D[m] discharges a small amount of ink and forms a small dot.

Accordingly, when the value shown by the waveform designation signal SI[m] is (b1,b2)=(0,1) and the driving signal Vin[m] supplied to the discharging unit D[m] includes one waveform PL (PL1) in the unit period Tu, a small amount of ink is discharged from the discharging unit D[m] based on the one waveform PL, and a small dot is formed with the discharged ink.

When the value shown by the waveform designation signal SI[m] is (b1,b2)=(1,0) and the driving signal Vin[m] supplied to the discharging unit D[m] includes two waveforms PL (PL1 and PL2) in the unit period Tu, a small amount of ink is discharged from the discharging unit D[m] twice based on the two waveforms PL, the small amounts of ink which are discharged twice are combined to each other, and accordingly a medium dot is formed.

When the value shown by the waveform designation signal SI[m] is (b1,b2)=(1,1) and the driving signal Vin[m] supplied to the discharging unit D[m] includes three waveforms PL (PL1 to PL3) in the unit period Tu, a small amount of ink is discharged from the discharging unit D[m] three times based on the three waveforms PL, the small amounts of ink which are discharged three times are combined to each other, and accordingly a large dot is formed.

Meanwhile, when the value shown by the waveform designation signal SI[m] is (b1,b2)=(0,0) and the driving signal Vin[m] supplied to the discharging unit D[m] does not include the waveform PL and is maintained as the reference potential V0 in unit period Tu, the ink is not discharged from the discharging unit D[m] and the dot is not formed (the recording is not performed).

In the embodiment, as clearly described above, the medium dot has a size which is double the size of the small dot and the large dot has a size which is three times of that of the small dot.

In the embodiment, the waveform PL of the driving waveform signal Com is determined so that the small amount of ink discharged for forming a small dot is an amount which is approximately ⅓ of the ink necessary for forming a unit structure. That is, the unit structure is configured with any one of three patterns of one large dot, a combination of one medium dot and one small dot, and a combination of three small dots.

In the embodiment, one unit structure is provided with respect to one voxel Vx. That is, in the embodiment, the dots are formed in one voxel Vx with any one of three patterns of one large dot, a combination of one medium dot and one small dot, and a combination of three small dots.

2. Data Generation Process and Formation Process

Next, the data generation process and the formation process executed by the three-dimensional object formation system 100 will be described with reference to FIG. 10 to FIG. 13.

2.1. Outline of Data Generation Process and Formation Process

FIG. 10 is a flowchart showing an example of the operation of the three-dimensional object formation system 100 when the data generation process and the formation process are executed.

The data generation process is a process executed by the formation data generation unit 93 of the host computer 9 and is started when the model data Dat output by the model data generation unit 92 is acquired by the formation data generation unit 93. The processes in Steps S100, S110, and S120 shown in FIG. 10 correspond to the data generation process.

As shown in FIG. 10, when the data generation process is started, the formation data generation unit 93 generates section model data items Ldat[q] (Ldat[1] to Ldat[Q]) based on the model data Dat output by the model data generation unit 92 (S100). As described above, in Step S100, the formation data generation unit 93 executes the shape complementation process of complementing the hollow portion having the shape shown by the model data Dat and generating the section model data Ldat so that a part or the entire area of the inside of the three-dimensional object Obj with respect to the outer surface SF is a solid shape. The shape complementation process will be described later in detail.

Next, the formation data generation unit 93 executes a formation mode determination process of determining the formation mode based on the residual amount information R output by the residual amount information output unit 62, more specifically, the information indicating residual amount RCL of the clear ink among the residual amount information R (S110).

Then, the formation data generation unit 93 determines the arrangement of the dots to be formed by the three-dimensional object formation apparatus 1 for forming the formation body LY[q] corresponding to the shape and the color shown by the section model data Ldat[q] and outputs the determined result as the formation body data FD[q] (S120).

As described above, the formation data generation unit 93 executes the data generation process shown in Steps S100 to S120 of FIG. 10.

The three-dimensional object formation system 100 executes the formation process after executing the data generation process.

The formation process is a process executed by the three-dimensional object formation apparatus 1 under the control of the control unit 6 and is started when the formation body data FD output by the host computer 9 is acquired by the three-dimensional object formation apparatus 1. The processes in Steps S130 to S180 shown in FIG. 10 correspond to the formation process.

As shown in FIG. 10, the control unit 6 sets "1" for a variable q showing the number of times of execution of the lamination process (S130). Next, the control unit 6 acquires a formation body data FD[q] generated by the formation data generation unit 93 (S140). The control unit 6 controls the lift mechanism driving motor 71 so that the formation table 45 moves to a position for forming the formation body LY[q] (S150).

For the position of the formation table 45 for forming the formation body LY[q], any position may be used as long as it is a position where the ink discharged from the head unit 3 can be properly landed on a dot formation position (voxel Vxq) designated by the formation body data FD[q]. For example, in Step S150, the control unit 6 may control the position of the formation table 45 so that a space between the formation body LY[q] and the head unit 3 in the Z axis direction is constant. In this case, the control unit 6, for example, may move the formation table 45 in the negative Z direction by an amount of the predetermined thickness ΔZ during the time after the formation body LY[q] is formed in the q-th lamination process and before the formation of the formation body LY[q+1] in the (q+1)-th lamination process is started.

In Step S150, after moving the formation table 45 to a position for forming the formation body LY[q], the control unit 6 controls the operations of the head unit 3, the position change mechanism 7, and the curing unit 61 so that the formation body LY[q] is formed based on the formation body data FD[q] (S160). As clearly described in FIGS. 2A to 2E, the formation body LY[1] is formed on the formation table 45 and the formation body LY[q+1] is formed on the formation body LY[q].

After that, the control unit 6 determines whether or not the variable q satisfies an expression of "q≥Q" (S170). When the determined result is positive, it is determined that the formation of the three-dimensional object Obj is completed and the formation process is finished, and meanwhile, when the determined result is negative, 1 is added to the variable q and the process proceeds to Step S140 (S180).

As described above, by executing the data generation process shown in Steps S100 to S120 of FIG. 10, the formation data generation unit 93 of the three-dimensional object formation system 100 generates the formation body data items FD[1] to FD[Q] based on the model data Dat, and by executing the formation process shown in Steps S130 to S180 of FIG. 10, the three-dimensional object formation apparatus 1 of the three-dimensional object formation system 100 forms the three-dimensional object Obj based on the formation body data items FD[1] to FD[Q].

FIG. 10 is merely an example of the flow of the data generation process and the formation process. For example, in FIG. 10, the formation process is started after completing the data generation process, but the invention is not limited to this embodiment, and the formation process may be started before completing the data generation process. For example, when the formation body data FD[q] is generated in the data generation process, the formation process (that is, the q-th lamination process) of forming the formation body LY[q] may be executed based on the formation body data FD[q], without waiting for the generation of the next formation body data FD[q+1].

2.2. Shape Complementation Process

As described above, in Step S100, the formation data generation unit 93 executes the shape complementation process of complementing a part or the entire hollow portion having the shape of the outer surface SF of the three-dimensional object Obj designated by the model data Dat and generating the section model data Ldat so that a part or the entirety of the inner area with respect to the outer surface SF has a solid structure.

Hereinafter, an example of the structure of the inside of the three-dimensional object Obj with respect to the outer surface SF generated based on the section model data Ldat and the shape complementation process of determining the structure of the inside with respect to the outer surface SF will be described with reference to FIG. 11A to FIG. 12.

First, the structure of the inside of the three-dimensional object Obj with respect to the outer surface SF will be described with reference to FIGS. 11A and 11B.

Figure 11A:
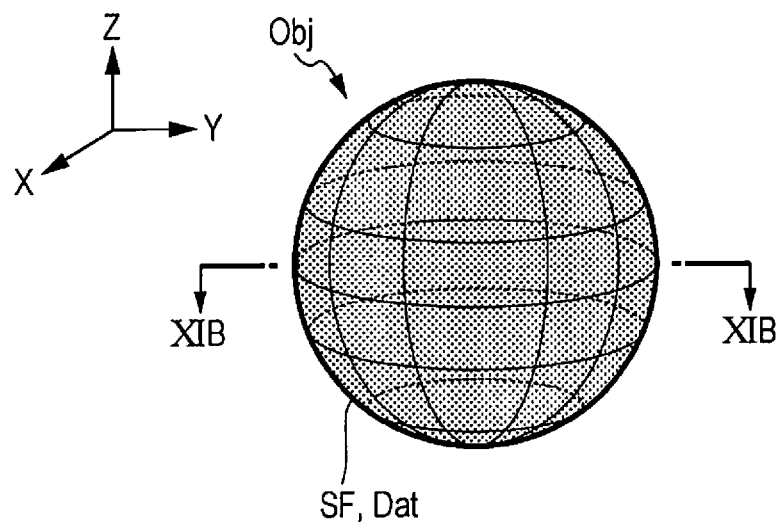
FIGS. 11A and 11B are explanatory diagrams for illustrating a three-dimensional object.
Figure 11B:
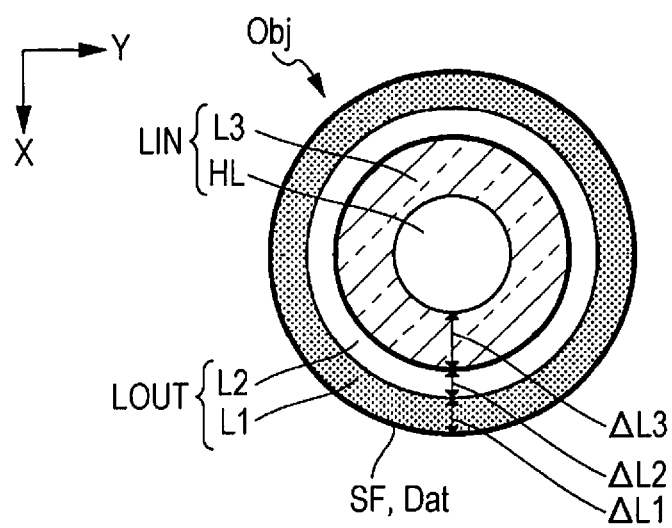

Herein, FIG. 11A is a perspective view of the three-dimensional object Obj and FIG. 11B is a sectional view when the three-dimensional object Obj shown in FIG. 11A is sectioned along a plane parallel to the X axis and the Y axis through a linear line XIB-XIB. In FIGS. 11A and 11B, for convenience of illustration, a case of forming the spherical three-dimensional object Obj having a shape different from those in FIG. 2A to FIG. 3 is assumed.

As shown in FIG. 11B, the three-dimensional object Obj formed by the three-dimensional object formation system 100 includes three layers of a chromatic layer L1, a shielding layer L2, and a filling layer L3 in the order from the outer surface SF which is an outline of the three-dimensional object Obj to the inside of the three-dimensional object Obj and further includes a hollow portion HL in the inside with respect to the third layer.

Herein, the chromatic layer L1 is a layer formed with the ink including the chromatic ink and is a layer including the outer surface SF for expressing the color of the three-dimensional object Obj. The shielding layer L2 is a layer formed using the white ink, for example, and is a layer for preventing the color of the inner portion of the three-dimensional object Obj with respect to the chromatic layer L1 from transmitting the chromatic layer L1 and being visualized from the outside of the three-dimensional object Obj. That is, the chromatic layer L1 and the shielding layer L2 are provided in order to properly express the color to be displayed by the three-dimensional object Obj. Hereinafter, among the three-dimensional object Obj, the chromatic layer L1 and the shielding layer L2 provided in order to properly express the color to be displayed by the three-dimensional object Obj may be referred to as an outer area LOUT of the three-dimensional object Obj.

The filing layer L3 is a layer provided in order to ensure the strength of the three-dimensional object Obj and is formed using the clear ink in principle. Hereinafter, among the three-dimensional object Obj, the filling layer L3 and the hollow portion HL provided in the inside with respect to the outer area LOUT may be referred to as an inner area LIN of the three-dimensional object Obj (or the "inside of the three-dimensional object Obj").

In the embodiment, for simplification, as shown in FIG. 11B, a case where each layer is provided so that the chromatic layer L1 has an approximately even thickness ΔL1, the shielding layer L2 has an approximately even thickness ΔL2, and the filling layer L3 has an approximately even thickness ΔL3, is assumed, but the thickness of each layer may not be approximately uniform.

The expression of "approximately uniform" or "approximately the same" in this specification include a case where the state can be assumed as uniform or the same when ignoring various errors, in addition to a case where the state is completely uniform or the same. The various errors which can be ignored include a discrete error generated when the shape shown by the model data Dat is represented as an assembly of the voxels Vx.

FIG. 12 is a flowchart showing an example of the operation of the formation data generation unit 93 when executing the shape complementation process.

As shown in FIG. 12, the formation data generation unit 93 first determines an area of the model of the three-dimensional object Obj represented by the model data Dat having the thickness ΔL1 from the outer surface SF of the three-dimensional object Obj to the inside of the three-dimensional object Obj, as the chromatic layer L1 (S200). The formation data generation unit 93 determines an area having the thickness ΔL2 from the inner surface of the chromatic layer L1 to the inside of the three-dimensional object Obj, as the shielding layer L2 (S210). The formation data generation unit 93 determines an area having the thickness ΔL3 from the inner surface of the shielding layer L2 to the inside of the three-dimensional object Obj, as the filling layer L3 (S220). The formation data generation unit 93 determines a portion of the inside of the three-dimensional object Obj with respect to the filling layer L3 as the hollow portion HL (S230).

By executing the shape complementation process described above, the formation data generation unit 93 generates the section model data Ldat for forming the three-dimensional object Obj including the chromatic layer L1, the shielding layer L2, and the filling layer L3, as shown in FIG. 11B.

2.3. Formation Mode Determination Process

As described above, in Step S110, the formation data generation unit 93 executes the formation mode determination process which is a process of determining the formation mode based on the residual amount information R supplied form the three-dimensional object formation apparatus 1. Hereinafter, the formation mode determination process and the formation mode determined in the formation mode determination process will be described.

The three-dimensional object formation apparatus 1 of the three-dimensional object formation system 100 according to the embodiment can execute the formation process in three formation modes which are a normal formation mode (an example of a "first formation mode"), a switch formation mode (an example of a "second formation mode"), and a mixed formation mode (an example of a "third formation mode"). The formation mode determination process executed by the formation data generation unit 93 is a process of selecting one formation mode when executing the formation process by the three-dimensional object formation apparatus 1 in the formation process, from the three formation modes.

Herein, the normal formation mode is a formation mode of forming an inner area LIN of the three-dimensional object Obj using clear ink (an example of "first liquid") to be originally used in the formation of the inner area LIN of the three-dimensional object Obj, in the formation process. That is, when the formation process is executed in the normal formation mode, the filling layer L3 which is a solid portion of the inner area LIN is formed using the clear ink.

The switch formation mode is a formation mode of forming the inner area LIN of the three-dimensional object Obj using ink other than the clear ink to be originally used in the formation of the inner area LIN of the three-dimensional object Obj, in the formation process. That is, when the formation process is executed in the switch formation mode, the filling layer L3 is formed using ink other than the clear ink, that is, at least one type of ink (an example of "second liquid") among the chromatic ink, the achromatic ink, and the supporting ink.

The mixed formation mode is a formation mode of forming the inner area LIN of the three-dimensional object Obj using both of the clear ink to be originally used in the formation of the inner area LIN of the three-dimensional object Obj and ink other than the clear ink, in the formation process. That is, when the formation process is executed in the mixed formation mode, the filling layer L3 is formed using the clear ink and ink other than the clear ink.

FIG. 13 is an explanatory diagram for illustrating selection (determination) of the formation mode in the formation mode determination process executed by the formation data generation unit 93.

As shown in the drawing, the formation data generation unit 93 selects the switch formation mode as the formation mode, when the residual amount RCL of the clear ink shown by the residual amount information R satisfies an expression of "RCL≤α1". A reference amount α1 (an example of a "first reference amount") is a value satisfying an expression of "α1≥0".

That is, the formation data generation unit 93 selects the switch formation mode of forming the inner area LIN of the three-dimensional object Obj by replacing the clear ink with the ink other than the clear ink, when the residual amount RCL of the clear ink is equal to or smaller than the reference amount α1 and the clear ink may be insufficient in the execution of the formation process.

The formation data generation unit 93 selects the mixed formation mode as the formation mode, when the residual amount RCL of the clear ink shown by the residual amount information R satisfies an expression of "α1<RCL≤α2". A reference amount α2 (an example of a "second reference amount") is a value satisfying an expression of "α1≥α2".

That is, the formation data generation unit 93 selects the mixed formation mode of forming the inner area LIN of the three-dimensional object Obj by using both of the clear ink and the ink other than the clear ink, when the residual amount of the clear ink is greater than the reference amount α1 but equal to or smaller than the reference amount α2 and it is determined that the amount thereof is not sufficient amount.

The formation data generation unit 93 selects the normal formation mode as the formation mode, when the residual amount RCL of the clear ink shown by the residual amount information R satisfies an expression of "α2<RCL".

That is, the formation data generation unit 93 selects the normal formation mode of forming the inner area LIN of the three-dimensional object Obj by using only the clear ink which is expected to be originally used in the formation of the inner area LIN, when the residual amount of the clear ink is determined as a sufficient amount which is greater than the reference amount α2.

As described above, in Step S110, the formation data generation unit 93 selects any one formation mode among the normal formation mode, the switch formation mode, and the mixed formation mode.

In Step S120 described above, the formation data generation unit 93 generates the formation body data items FD[1] to FD[Q] so that the formation process is executed in the formation mode selected in Step S110. That is, the formation data generation unit 93 generates the formation body data FD[q] so that the filling layer L3 is formed using the clear ink, when the normal formation mode is selected as the formation mode. In addition, the formation data generation unit 93 generates the formation body data FD[q] so that the filling layer L3 is formed using the ink other than the clear ink, when the switch formation mode is selected as the formation mode. Further, the formation data generation unit 93 generates the formation body data FD[q] so that the filling layer L3 is formed using both of the clear ink and the ink other than the clear ink, when the mixed formation mode is selected as the formation mode.

When the formation mode is the switch formation mode or the mixed formation mode, the ink used in replacement of the clear ink (hereinafter, may be referred to as "switch ink") for forming the filling layer L3 is preferably the achromatic ink and is more preferably white ink.

The formation data generation unit 93 according to the embodiment selects the white ink as the switch ink, when the residual amount of the white ink is equal to or greater than a predetermined amount, and selects the achromatic ink other than white ink, when the residual amount of the white ink is smaller than a predetermined amount. For example, the formation data generation unit 93 may select the supporting ink as the switch ink, when the supporting ink is achromatic ink.

In addition, the formation data generation unit 93 according to the embodiment selects ink having high reflectance of visible light among chromatic ink, for example, yellow ink, as the switch ink, when the residual amount of the white ink is smaller than a predetermined amount and the residual amount of the achromatic ink other than the white ink is smaller than a predetermined amount.

3. Conclusion of Embodiment

As described above, the three-dimensional object formation system 100 according to the embodiment forms the inner area LIN using the switch ink other than the clear ink such as the achromatic ink, the chromatic ink, or the supporting ink, when the residual amount RCL of the clear ink to be originally used in the formation of the inner area LIN of the three-dimensional object Obj is not sufficient. Accordingly, it is possible to decrease a possibility of generation of the stopping of the formation process due to the insufficient clear ink, by comparing to a case of forming the inner area LIN using only the clear ink.

When the formation process is stopped, regarding dots configuring the formation bodies LY laminated in the lamination process being executed when stopping the formation process, and the dots configuring the formation bodies LY laminated in the lamination process which is one step before the lamination process being executed when stopping the formation process, the time of contacting air, for example, is increased by the time of stopping. Accordingly, variations in the degree of curing may be generated between the plurality of dots configuring the three-dimensional object Obj. In this case, color unevenness, concavities and convexities, or a decrease in strength may be generated in the formed three-dimensional object Obj, due to the variations in the degree of curing between the dots. That is, when the formation process is stopped, the quality of the three-dimensional object Obj may be decreased, compared to a case where the formation process is not stopped.

In addition, when the formation process is stopped due to the insufficient clear ink, it is difficult to continue the formation process, if a user of the three-dimensional object formation system 100 does not replace the ink cartridge 48 corresponding to the clear ink during the execution of the formation process. That is, in the formation process, a user is forced to perform the replacement operation of the ink cartridge 48 and this may lead to a decrease in convenience according to the formation process.

With respect to this, in the embodiment, since it is possible to reduce a possibility of generation of the stopping of the formation process due to the insufficient clear ink, it is possible to prevent a decrease in quality of the three-dimensional object Obj due to the stopping of the formation process or a decrease in convenience due to the replacement operation of the ink cartridge 48 in the formation process.

The three-dimensional object formation system 100 according to the embodiment executes the formation process in the normal formation mode, when the residual amount RCL is greater than the reference amount α2 and the amount of the clear ink is sufficient, executes the formation process in the mixed formation mode, when the residual amount RCL is equal to or smaller than the reference amount α2 and the amount of the clear ink is not sufficient, and executes the formation process in the switch formation mode, when the residual amount RCL is equal to or smaller than the reference amount α1 and the clear ink may run out during the formation process. That is, in the embodiment, the formation process is executed in the formation mode corresponding to the residual amount RCL of the clear ink.

In general, the number of color material components of the clear ink is small and the cost thereof is low, compared to other ink (chromatic ink, achromatic ink, and supporting ink). In addition, in general, the strength of the cured clear ink is high, compared to other ink.

Accordingly, as in the embodiment, by executing the formation process in the formation mode corresponding to the residual amount RCL of the clear ink, it is possible to decrease the possibility of generation of the stopping of the formation process and to prevent an increase in cost due to the use of the switch ink, and it is possible to prevent a decrease in strength of the three-dimensional object Obj due to the usage of the switch ink.

B. Modification Examples

The above embodiment can be modified in various manners. Specific modified embodiments will be described hereinafter. Two or more embodiments arbitrarily selected from the below examples can be suitably combined with each other in a range not contradicting each other.

In the modification examples below, the same reference numerals used in the above description will be used for the elements exhibiting the same operations or functions as those in the above embodiment and the specific description thereof will be suitably omitted.

Modification Example 1

In the embodiment described above, the formation data generation unit 93 determines the formation mode based on the residual amount RCL of the clear ink when starting the formation process, but the invention is not limited to this embodiment, and the formation mode may be determined according to a possibility that the clear ink runs out during the execution of the formation process.

In addition to a case where the residual amount RCL of the clear ink is small, even in a case where the volume of the inner area LIN of the three-dimensional object Obj is great and the amount of the clear ink expected to be used in the formation process is great, the clear ink may run out during the execution of the formation process. Accordingly, in the modification example, it is possible to determine the formation mode according to a possibility that the clear ink runs out, by determining the formation mode based on both of the residual amount RCL of the clear ink and the consumption amount WCL of the clear ink necessary for forming the three-dimensional object Obj, as an example.

Figure 14:
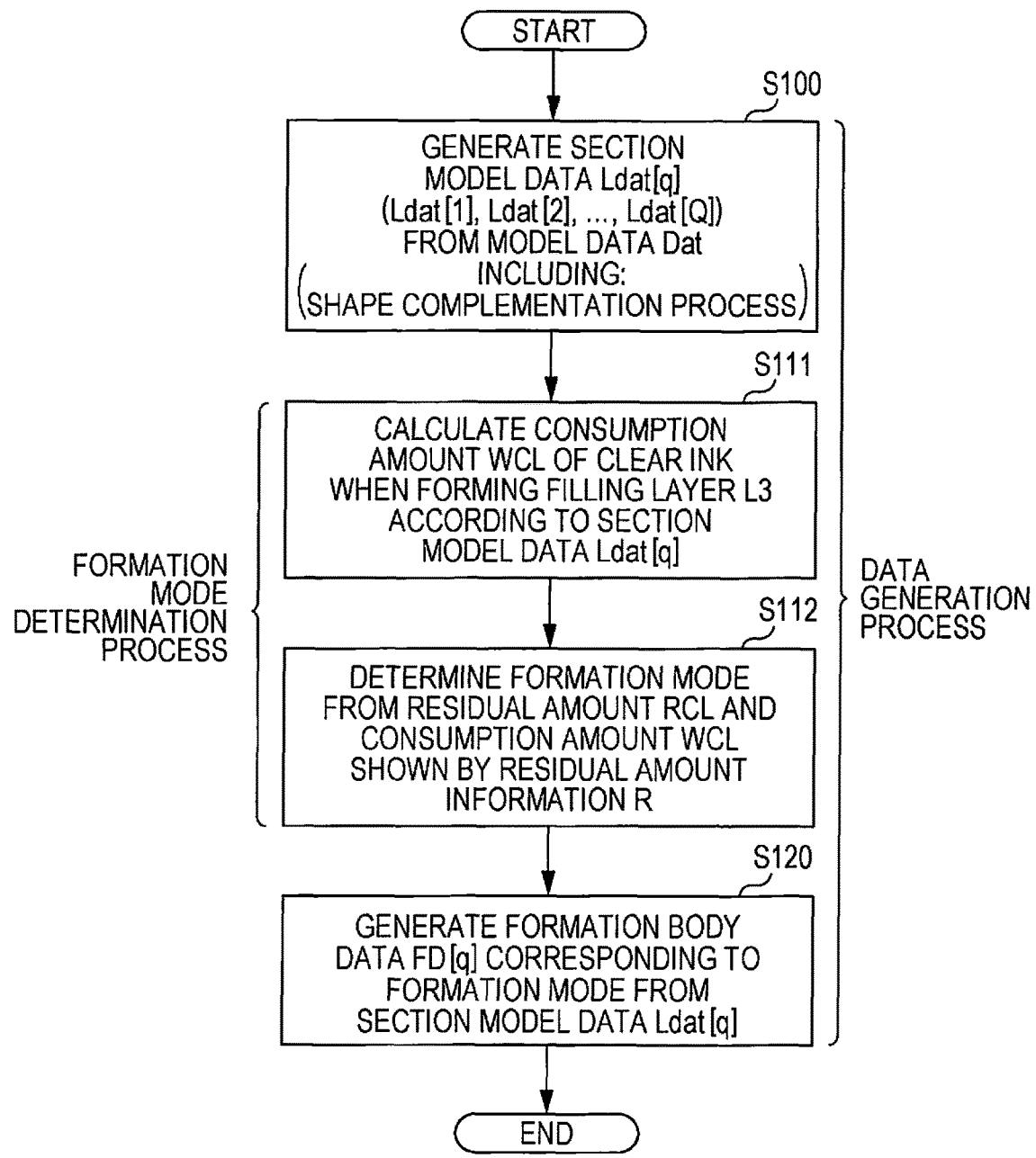
FIG. 14 is a flowchart showing a data generation process according to Modification Example 1.

FIG. 14 is a flowchart for illustrating the data generation process according to the modification example.

The data generation process according to the modification example shown in FIG. 14 is the same as the data generation process according to the embodiment shown in FIG. 10, except for that the formation mode determination process shown in Steps S111 and S112 is executed instead of the formation mode determination process shown in Step S110.

As shown in FIG. 14, the formation data generation unit 93 according to the modification example calculates the consumption amount WCL of the clear ink necessary for forming the three-dimensional object Obj in the data generation process (S111). In this case, the consumption amount WCL of the clear ink may be an approximate value. For example, in Step S111, the formation data generation unit 93 may calculate the volume of the inner area LIN based on the section model data items Ldat[1] to Ldat[Q] and may calculate the consumption amount WCL of the clear ink using the calculated result. For example, in Step S111, the formation data generation unit 93 may calculate the consumption amount WCL of the clear ink by determining the number and the size of the dots formed of the clear ink necessary for forming the three-dimensional object Obj in the normal formation mode, by decomposing the section model data items Ldat[1] to Ldat[Q] into the voxels Vx.

Next, the formation data generation unit 93 determines the formation mode based on the residual amount RCL of the clear ink and the consumption amount WCL of the clear ink (S112).

FIG. 15 is an explanatory diagram for illustrating the determination of the formation mode which is executed by the formation data generation unit 93 according to the modification example in Step S112.

As described above, the formation data generation unit 93 according to the modification example selects the switch formation mode as the formation mode, when the residual amount RCL and the consumption amount WCL of the clear ink satisfy an expression of "RCL−WCL≤β1". A reference amount β1 (another example of a "first reference amount") is a value satisfying an expression of "β1≥0".

In addition, the formation data generation unit 93 according to the modification example selects the mixed formation mode as the formation mode, when the residual amount RCL and the consumption amount WCL of the clear ink satisfy an expression of "β1<RCL−WCL≤β2". A reference amount β2 (another example of a "second reference amount") is a value satisfying an expression of "β1<β2".

The formation data generation unit 93 according to the modification example selects the normal formation mode as the formation mode, when the residual amount RCL and the consumption amount WCL of the clear ink satisfy an expression of "β2<RCL−WCL".

As described above, in the formation mode determination process according to the modification example shown in FIG. 14 and FIG. 15, the formation mode is determined by considering the consumption amount WCL of the clear ink, in addition to the residual amount RCL of the clear ink, and accordingly, even in a case of forming the three-dimensional object Obj having great volume, it is possible to decrease a possibility of the insufficient clear ink during the execution of the formation process.

Modification Example 2

In the embodiment and the modification examples described above, the three-dimensional object formation system 100 can execute the formation process in the three formation modes of the normal formation mode, the switch formation mode, and the mixed formation mode, but the invention is not limited to the embodiment, and the formation process may be executed in at least two formation modes among the three formation modes. Specifically, the three-dimensional object formation system 100 may execute the formation process in the normal formation mode and the switch formation mode or may execute the formation process in the normal formation mode and the mixed formation mode.

FIGS. 16 and 17 are explanatory diagrams for illustrating determination of the formation mode when the three-dimensional object formation system 100 according to the modification example can execute the formation process in two formation modes of the normal formation mode and the mixed formation mode.

Among these, FIG. 16 shows a case of determining the formation mode based on the residual amount RCL of the clear ink, as in the embodiment described above. As shown in FIG. 16, the formation data generation unit 93 according to this modification example may select the switch formation mode as the formation mode, when the residual amount RCL of the clear ink satisfies an expression of "RCL≤α1", and may select the normal formation mode as the formation mode, when the residual amount RCL of the clear ink satisfies an expression of "α1<RCL", for example.

FIG. 17 shows a case of determining the formation mode based on the residual amount RCL and the consumption amount WCL of the clear ink, as in Modification Example 1 described above. As shown in FIG. 17, the formation data generation unit 93 according to this modification example may select the switch formation mode as the formation mode, when the residual amount RCL and the consumption amount WCL of the clear ink satisfy an expression of "RCL−WCL≤β1", and may select the normal formation mode as the formation mode, when the residual amount RCL and the consumption amount WCL of the clear ink satisfy an expression of "β1<RCL−WCL".

Modification Example 3

In the embodiment and the modification examples described above, the ink which can be discharged by the three-dimensional object formation apparatus 1 is total six types of ink including three chromatic inks, one achromatic ink, the clear ink to be originally used in the formation of the inner area LIN, and the supporting ink, but the invention is not limited to this embodiment, and three-dimensional object formation apparatus 1 may discharge at least two kinds of ink including a predetermined type of ink (an example of "first liquid") to be used in the formation of the inner area LIN of the three-dimensional object Obj and ink which is type different from that of the predetermined type of ink.

In the embodiment and the modification examples described above, the clear ink is used as the predetermined type of ink for forming the inner area LIN of the three-dimensional object Obj, but the predetermined type of ink for forming the inner area LIN may be ink other than the clear ink.

In the embodiment and the modification examples described above, the residual amount information R shows the residual amount of the ink stored in each of the plurality of ink cartridges 48, but the residual amount information R may show the residual amount of the predetermined type of ink for forming the inner area LIN.

Modification Example 4

In the embodiment and the modification examples described above, the three-dimensional object Obj formed by the three-dimensional object formation apparatus 1 includes the outer area LOUT including the chromatic layer L1 and the shielding layer L2 and the inner area LIN including the filling layer L3 and the hollow portion HL, but the invention is not limited to the embodiment, and the three-dimensional object formation apparatus 1 may form a three-dimensional object Obj including at least the chromatic layer L1 and the filling layer L3. That is, the outer area LOUT of the three-dimensional object Obj may include at least the chromatic layer L1 including the outer surface and the inner area LIN of the three-dimensional object Obj may include at least the filling layer L3.

Modification Example 5

In the embodiment and the modification examples described above, the achromatic ink such as white ink, the achromatic supporting ink, and chromatic ink having high reflectance of visible light area are used as the switch ink, but the invention is not limited to the embodiment, and the switch ink may be any kinds of ink, as long as it is ink which can be discharged by the three-dimensional object formation apparatus 1.

Particularly, when the three-dimensional object Obj is formed to include the shielding layer L2, the color of the three-dimensional object Obj is hardly deteriorated due to usage of the switch ink in the formation of the inner area LIN, and accordingly, it is possible to use arbitrary ink as the switch ink.

Modification Example 6

In the embodiment and the modification examples described above, the three-dimensional object formation apparatus 1 forms the three-dimensional object Obj by laminating the formation bodies LY which are formed by curing the formation ink, but the invention is not limited to the embodiment, and formation bodies LY may be formed by solidifying powder spread in a layered shape by curable formation ink and the three-dimensional object Obj may be formed by laminating the formed formation bodies LY.

In this case, the three-dimensional object formation apparatus 1 may include a powder layer formation unit (not shown) which spreads the powder on the formation table 45 to have the predetermined thickness ΔZ to form a powder layer PW and a powder discarding unit (not shown) which discards the powder (powder other than powder solidified by the formation ink) not configuring the three-dimensional object Obj after forming the three-dimensional object Obj. Hereinafter, the powder layer PW for forming the formation body LY[q] is referred to as the powder layer PW[q].

FIG. 18 is a flowchart showing an example of the operation of the three-dimensional object formation system 100 when executing the formation process according to the modification example. The formation process according to the modification example shown in FIG. 18 is the same as the formation process according to the embodiment shown in FIG. 10, except for executing the process shown in Steps S161 and S162 instead of Step S160 and executing the process shown in Step S190 when the determined result in Step S170 is positive.

As shown in FIG. 18, the control unit 6 according to the modification example controls the operation of each unit of the three-dimensional object formation apparatus 1 so that the powder layer formation unit forms the powder layer PW[q] (S161).

The control unit 6 according to the modification example controls the operation of each unit of the three-dimensional object formation apparatus 1 so as to form dots on the powder layer PW[q] to form the formation body LY[q] based on the formation body data FD[q] (S162). Specifically, first, in Step S162, the control unit 6 controls the operation of the head unit 3 so that the formation ink or the supporting ink are discharged to the powder layer PW[q] based on the formation body data FD[q]. Next, the control unit 6 controls the operation of the curing unit 61 so as to solidify the powder of a portion where the dots are formed on the powder layer PW[q], by curing the dots formed with the ink discharged to the powder layer PW[q]. Accordingly, the powder of the powder layer PW[q] is solidified with the ink and the formation body LY[q] can be formed.

The control unit 6 according to the modification example controls the operation of the powder discarding unit so as to discard the powder not configuring the three-dimensional object Obj after the three-dimensional object Obj is formed (S190).

FIGS. 19A to 19F are explanatory diagrams for illustrating a relationship between the model data Dat and the section model data Ldat[q], the formation body data FD[q], the powder layer PW[q], and the formation body LY[q] according to the modification example.

Among these, FIGS. 19A and 19B show the section model data items Ldat[1] and Ldat[2] in the same manner as in FIGS. 2A and 2B. Even in the modification example, the section model data Ldat[q] is generated by slicing the model data Dat, the formation body data FD[q] is generated from the section model data Ldat[q], and the formation body LY[q] is formed with the dots formed based on the formation body data FD[q]. Hereinafter, the formation of the formation body LY[q] according to the modification example will be described with reference to FIGS. 19C to 19F using the formation bodies LY[1] and LY[2] as examples.

As shown in FIG. 19C, the control unit 6 controls the operation of the powder layer formation unit so as to form the powder layer PW[1] having the predetermined thickness ΔZ before forming the formation body LY[1] (see Step S161 described above).

Next, as shown in FIG. 19D, the control unit 6 controls the operation of each unit of the three-dimensional object formation apparatus 1 so that the formation body LY[1] is formed in the powder layer PW[1] (see Step S162 described above). Specifically, first, the control unit 6 controls the operation of the head unit 3 based on the formation body data FD[1] to discharge the ink to the powder layer PW[1] to form the dots. Then, the control unit 6 controls the curing unit 61 so as to cure the dots formed on the powder layer PW[1] to solidify the powder in a portion where the dot is formed and form the formation body LY[1].

After that, as shown in FIG. 19E, the control unit 6 controls the powder layer formation unit so as to form the powder layer PW[2] having the predetermined thickness ΔZ on the powder layer PW[1] and the formation body LY[1]. As shown in FIG. 19F, the control unit 6 controls the operation of each unit of the three-dimensional object formation apparatus 1 so that the formation body LY[2] is formed.

As described above, the control unit 6 forms the formation body LY[q] in the powder layer PW[q] based on the formation body data FD[q] and laminates the formation bodies LY[q] to form the three-dimensional object Obj.

Modification Example 7

In the embodiment described above, the ink discharged from the discharging unit D is a curable ink such as an ultraviolet curable ink, but the invention is not limited to the embodiment, and ink formed of a thermoplastic resin may be used.

In this case, it is preferable that the ink is discharged in a state of being heated in the discharging unit D. That is, the discharging unit D according to the modification example preferably performs a so-called thermal type discharging process of generating air bubbles in the cavity 320 to increase pressure in the cavity 320 by heating a heating element (not shown) provided in the cavity 320, to discharge the ink.

In this case, since the ink discharged from the discharging unit D is cooled and cured by the outside air, the three-dimensional object formation apparatus 1 may not include the curing unit 61.

Modification Example 8

In the embodiment and the modification examples described above, sizes of the dots which can be discharged by the three-dimensional object formation apparatus 1 are three of a small dot, a medium dot, and a large dot, but the invention is not limited to this embodiment, and the sizes of the dots which can be discharged by the three-dimensional object formation apparatus 1 may be one or more.

Modification Example 9

In the embodiment and the modification examples described above, the formation data generation unit 93 is provided in the host computer 9, but the invention is not limited to this embodiment, and the formation data generation unit 93 may be provided in the three-dimensional object formation apparatus 1. For example, the formation data generation unit 93 may be mounted as a functional block which is realized by operation of the control unit 6 according to the control program.

When the three-dimensional object formation apparatus 1 includes the formation data generation unit 93, the three-dimensional object formation apparatus 1 can generate the formation body data FD based on the model data Dat supplied from the outside of the three-dimensional object formation apparatus 1 and form the three-dimensional object Obj based on the generated formation body data FD.

Modification Example 10

In the embodiment and the modification examples described above, the three-dimensional object formation system 100 includes the model data generation unit 92, but the invention is not limited to this embodiment, and the three-dimensional object formation system 100 may be configured without including the model data generation unit 92.

That is, the three-dimensional object formation system 100 may form the three-dimensional object Obj based on the model data Dat supplied from the outside of the three-dimensional object formation system 100.

Modification Example 11

In the embodiment and the modification examples described above, the driving waveform signal Com is a signal including the waveforms PL1 to PL3, but the invention is not limited to this embodiment, and the driving waveform signal Com may be any signal, as long as it is a signal including a waveform at which the amounts of ink corresponding to at least one type of the size of the dot can be discharged from the discharging unit D. For example, the driving waveform signal Com may be set as a waveform different depending on the type of the ink.

In addition, in the embodiment and the modification examples described above, the bit number of the waveform designation signal SI[m] is two bits, but the invention is not limited to this embodiment, and the bit number of the waveform designation signal SI[m] may be suitably determined depending on the number of types of the sizes of the dots formed with the ink discharged from the discharging unit D.

What is claimed is:

1. A three-dimensional object formation apparatus comprising:
a head unit which discharges a plurality of types of liquid including first liquid and second liquid different from the first liquid and forms dots with the discharged liquid;
a curing unit which cures the dots;
a storage unit which stores the first liquid;
an output unit which outputs residual amount information showing a residual amount of the first liquid stored in the storage unit; and
a control unit which controls the head unit and the curing unit to form a three-dimensional object with the cured dots by laminating a plurality of formation bodies each of which has a predetermined thickness, based on formation body data that determines a shape and a color of each of the plurality of formation bodies and that is created based on a selected formation mode, which is selected from a first formation mode, a second formation mode, and a third formation mode according to the residual amount information of the first liquid, before commencing executing the formation of the three-dimensional object,
when the formation body data indicates that the plurality of formation bodies include formation bodies each of which includes an outer portion and an inner portion of the three-dimensional object,
the control unit controlling the head unit to form a plurality of dots formed of the first liquid to form the inner portion of each of the formation bodies when the selected formation mode is the first formation mode,
the control unit controlling the head unit to form a plurality of dots not including dots formed of the first liquid and including dots formed of the second liquid to form the inner portion of each of the formation bodies when the selected formation mode is the second formation mode, and
the control unit controlling the head unit to form a plurality of dots including both dots formed of the first liquid and dots formed of the second liquid to form the inner portion of each of the formation bodies when the selected information mode is the third formation mode.

2. The three-dimensional object formation apparatus according to claim 1,
wherein the control unit controls the head unit in the second formation mode, when the residual amount of the first liquid shown by the residual amount information is equal to or smaller than a first reference amount.

3. The three-dimensional object formation apparatus according to claim 1,
wherein the control unit controls the head unit in the second formation mode, when an amount obtained by subtracting a consumption amount of the first liquid necessary for the formation of the three-dimensional object from a residual amount of the first liquid shown by the residual amount information is equal to or smaller than a first reference amount.

4. The three-dimensional object formation apparatus according to claim 1,
wherein the control unit controls the head unit in the first formation mode, when the residual amount of the first liquid shown by the residual amount information is greater than a second reference amount, and
the control unit controls the head unit in the third formation mode, when the residual amount of the first liquid shown by the residual amount information is equal to or smaller than the second reference amount.

5. The three-dimensional object formation apparatus according to claim 1,
wherein the control unit controls the head unit in the first formation mode, when an amount obtained by subtracting a consumption amount of the first liquid necessary for the formation of the three-dimensional object from a residual amount of the first liquid shown by the residual amount information is greater than a second reference amount, and
the control unit controls the head unit in the third formation mode, when an amount obtained by subtracting a consumption amount of the first liquid necessary for the formation of the three-dimensional object from a residual amount of the first liquid shown by the residual amount information is equal to or smaller than the second reference amount.

6. The three-dimensional object formation apparatus according to claim 1,
wherein the second liquid is achromatic liquid.

7. The three-dimensional object formation apparatus according to claim 1,
wherein the second liquid reflects visible light at a rate equal to or greater than a predetermined rate.

8. The three-dimensional object formation apparatus according to claim 1,
wherein the control unit controls the head unit in the second formation mode, when the residual amount of the first liquid shown by the residual amount information is equal to or smaller than a first reference amount,
the control unit controls the head unit in the first formation mode, when the residual amount of the first liquid shown by the residual amount information is greater than a second reference amount that is different from the first reference amount, and
the control unit controls the head unit in the third formation mode, when the residual amount of the first liquid shown by the residual amount information is greater than the first reference amount and equal to or smaller than the second reference amount.

9. The three-dimensional object formation apparatus according to claim 1,
wherein the control unit controls the head unit in the second formation mode, when an amount obtained by subtracting a consumption amount of the first liquid necessary for the formation of the three-dimensional object from a residual amount of the first liquid shown by the residual amount information is equal to or smaller than a first reference amount,
the control unit controls the head unit in the first formation mode, when the amount obtained by subtracting the consumption amount of the first liquid necessary for the formation of the three-dimensional object from the residual amount of the first liquid shown by the residual amount information is greater than a second reference amount that is different from the first reference amount, and
the control unit controls the head unit in the third formation mode, when the amount obtained by subtracting the consumption amount of the first liquid necessary for the formation of the three-dimensional object from the residual amount of the first liquid shown by the residual amount information is greater than the first reference amount and equal to or smaller than the second reference amount.

10. The three-dimensional object formation apparatus according to claim 1,
wherein the head unit includes a first nozzle array that discharges the first liquid and a second nozzle array that is different from the first nozzle array and discharges the second liquid,
the control unit controls the first nozzle array to form the plurality of dots formed of the first liquid to form the inner portion of each of the formation bodies when the selected formation mode is the first formation mode,
the control unit controls the second nozzle array to form the plurality of dots not including dots formed of the first liquid and including dots formed of the second liquid to form the inner portion of each of the formation bodies when the selected formation mode is the second formation mode, and
the control unit controls the first nozzle array and the second nozzle array to form the plurality of dots including both the dots formed of the first liquid and the dots formed of the second liquid to form the inner portion of each of the formation bodies when the selected information mode is the third formation mode.

11. A three-dimensional object formation apparatus comprising:
a head unit which discharges a plurality of types of liquid including first liquid and second liquid different from the first liquid and forms dots with the discharged liquid;
a curing unit which cures the dots;
a storage unit which stores the first liquid;
an output unit which outputs residual amount information showing a residual amount of the first liquid stored in the storage unit; and
a control unit which controls the head unit and the curing unit to form a three-dimensional object with the cured dots by laminating a plurality of formation bodies each of which has a predetermined thickness, based on formation body data that determines a shape and a color of each of the plurality of formation bodies and that is created based on a selected formation mode, which is selected from a first formation mode and a third formation mode according to the residual amount information of the first liquid, before commencing executing the formation of the three-dimensional object,
when the formation body data indicates that the plurality of formation bodies include formation bodies each of which includes an outer portion and an inner portion of the three-dimensional object,
the control unit controlling the head unit to form a plurality of dots formed of the first liquid to form the inner portion of each of the formation bodies when the selected formation mode is the first formation mode, and the control unit controlling the head unit to form a plurality of dots including both dots formed of the first liquid and dots formed of the second liquid to form the inner portion of each of the formation bodies when the selected formation mode is the third formation mode.

12. A three-dimensional object formation system comprising:
a head unit which discharges a plurality of types of liquid including first liquid and second liquid different from the first liquid and forms dots with the discharged liquid;
a curing unit which cures the dots;
a storage unit which stores the first liquid;
an output unit which outputs residual amount information showing a residual amount of the first liquid stored in the storage unit; and
a system control unit which selects, according to the residual amount information of the first liquid, one formation mode among a plurality of formation modes including a first formation mode, a second formation mode, a third formation mode, and controls an operation of the head unit so as to form a three-dimensional object with the cured dots by laminating a plurality of formation bodies each of which has a predetermined thickness, based on formation body data that determines a shape and a color of each of the plurality of formation bodies and that is created based on a selected formation mode, which is selected from the first formation mode, the second formation mode, and the third formation mode, before commencing executing formation of the three-dimensional object,
when the formation body data indicates that the plurality of formation bodies include formation bodies each of which includes an outer portion and an inner portion of the three-dimensional object,
the system control unit controlling the head unit to form a plurality of dots formed of the first liquid to form the inner portion of each of the formation bodies when the selected formation mode is selecting a first formation mode,
the system control unit controlling the head unit to form a plurality of dots not including dots formed of the first liquid and including dots formed of the second liquid to form the inner portion of each of the formation bodies when the selected formation mode is the second formation mode, and
the system control unit controlling the head unit to form a plurality of dots including both dots formed of the first liquid and dots formed of the second liquid to form the inner portion of each of the formation bodies when the selected information mode is the third formation mode.

* * * * *